(12) United States Patent
Sano et al.

(10) Patent No.: US 11,115,235 B2
(45) Date of Patent: Sep. 7, 2021

(54) SEMICONDUCTOR DEVICE, COMMUNICATION SYSTEMS AND METHOD FOR CONTROLLING THE COMMUNICATION SYSTEM

(71) Applicant: RENESAS ELECTRONICS CORPORATION, Tokyo (JP)

(72) Inventors: Keiichiro Sano, Tokyo (JP); Jean Noel Mouthe, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 84 days.

(21) Appl. No.: 16/717,030

(22) Filed: Dec. 17, 2019

(65) Prior Publication Data

US 2020/0213148 A1 Jul. 2, 2020

(30) Foreign Application Priority Data

Dec. 27, 2018 (JP) .............................. JP2018-244393

(51) Int. Cl.
*H04L 12/28* (2006.01)
*H04L 12/40* (2006.01)
*H04L 7/00* (2006.01)

(52) U.S. Cl.
CPC ........ *H04L 12/4015* (2013.01); *H04L 7/0091* (2013.01); *H04L 12/40013* (2013.01); *H04L 12/40019* (2013.01); *H04L 2012/40273* (2013.01)

(58) Field of Classification Search
None
See application file for complete search history.

(56) References Cited

U.S. PATENT DOCUMENTS

| 5,512,888 | A | * | 4/1996 | Hoshino | ............. H04L 12/4135 340/12.18 |
| 10,152,072 | B1 | * | 12/2018 | Elhebeary | ............... G05F 1/565 |
| 2011/0128794 | A1 | * | 6/2011 | Yoon | ..................... G11C 7/1051 365/189.05 |
| 2014/0029328 | A1 | * | 1/2014 | Ribeiro | .............. G11C 13/0007 365/148 |
| 2018/0032124 | A1 | * | 2/2018 | Fukuoka | ............... G06F 1/3296 |

(Continued)

FOREIGN PATENT DOCUMENTS

JP 2014-042091 A 3/2014
JP 2018-148438 A 9/2018

OTHER PUBLICATIONS

Extended European Search Report issued in corresponding European Patent Application No. 19216943.1-1216, dated Jul. 13, 2020.

(Continued)

*Primary Examiner* — Elisabeth Benoit Magloire
(74) *Attorney, Agent, or Firm* — McDermott Will & Emery LLP

(57) ABSTRACT

A semiconductor device capable of improving the efficiencies of communication systems is provided. The semiconductor device comprises: an open period in which reception of data or transmission is allowed; a clock generation circuit defining a close period in which transmission of data and reception are not allowed; and a TSN controller connected to the clock generation circuit and performing transmission of data or reception, wherein the TSN controller performs semiconductor device or reception at another time than open period.

18 Claims, 23 Drawing Sheets

(56) References Cited

U.S. PATENT DOCUMENTS

2018/0134279 A1* 5/2018 Barkdull ................. B60L 53/20
2018/0219507 A1* 8/2018 Wang ..................... B60K 6/445
2018/0262896 A1   9/2018 Manabe
2019/0041824 A1* 2/2019 Chavez ................... H04L 69/40
2019/0207862 A1* 7/2019 Kajio ...................... H04L 67/12

OTHER PUBLICATIONS

L. Zhao et al., "Worst-Case Latency Analysis for IEEE 802.1Qbv Time Sensitive Networks Using Network Calculus", IEEE Access, vol. 6, Jul. 23, 2018, pp. 41803-41815.

Janos Farkas, "Introduction to IEEE 802.1 Focus on the Time-Sensitive Networking Task Group", IEEE-SA, vol. 802.1, No. v01, Mar. 5, 2018, pp. 1-54.

* cited by examiner

SEMICONDUCTOR DEVICE, COMMUNICATION SYSTEMS AND METHOD FOR CONTROLLING THE COMMUNICATION SYSTEM

CROSS-REFERENCE TO RELATED APPLICATIONS

The disclosure of Japanese Patent Application No. 2018-244393 filed on Dec. 27, 2018 including the specification, drawings and abstract is incorporated herein by reference in its entirety.

BACKGROUND

The present invention relates to a semiconductor device, a communication system and a method for controlling the communication system, for example, the communication system mounted on a vehicle, a control method for controlling the communication system, and the semiconductor device for configuring the communication system.

For example, a vehicle such as an automobile is equipped with a large number of sensors for monitoring the state of the vehicle, a human interface for notifying the driver of the state of the vehicle, and the like. Such sensors and human interfaces are connected to Ethernet (registered trademark) buses, for example, to form the communication systems. For example, Japanese Unexamined Patent Application Publication No. JP-A-2014-42091 and No. JP-A-2018-148438 disclose techniques relating to Ethernet.

SUMMARY

The Ethernet-TSN (Time-Sensitive Networking) standard, which is an extension of the Ethernet standard, is applied to in-vehicle communication systems. In the Ethernet-TSN standard, the time division queuing algorithm is applied, and the Ethernet-TSN standard has been developed in the IEEE standard since 2017, and the core technique for the advanced driving support system (ADAS) and the automated driving is attracting attention. Although the Ethernet-TSN standard is not limited to the in-vehicle communication system and can be applied to various systems, it is exemplified in this specification that it is applied to the in-vehicle communication system.

In the Ethernet-TSN, communication is performed between a plurality of device's through gates. The gates are configured by an open period (Open) and a close period (Close). In the period in which the gate is open, communication between the device is permitted, and in the period in which the gate is closed, communication between the device is not permitted. In order to complete the communication within a limited open time, it is required to perform the communication with margins in view of a latency period which occurs when data is transmitted and received. In order to secure this margin, there is a problem that the efficiency of the communication system is lowered.

Japanese Unexamined Patent Application Publication No. JP-A-2014-42091 and No. JP-A-2018-148438 disclose techniques related to Ethernet, but Japanese Unexamined Patent Application Publication No. JP-A-2014-42091 and No. JP-A-2018-148438 do not disclose the communication systems to which the Ethernet-TSN standard is applied. Further, the problem related to the above-mentioned Ethernet-TSN is not recognized.

Other objects and novel features will become apparent from the description of this specification and the accompanying drawings.

The semiconductor device according to one embodiment is as follows.

The semiconductor device comprises: an open period permitted to reception of data or transmit; a clock generation circuit defining a close period for which transmission of data and reception are not permitted; and a controller connected to the clock generation circuit for performing transmission of data or reception. Here, the controller performs transmission of data or reception at a time differing from that of the open period.

According to one embodiment, the semiconductor device capable of improving the efficiencies of the communication systems may be provided.

DETAILED DESCRIPTION

Figure 1:
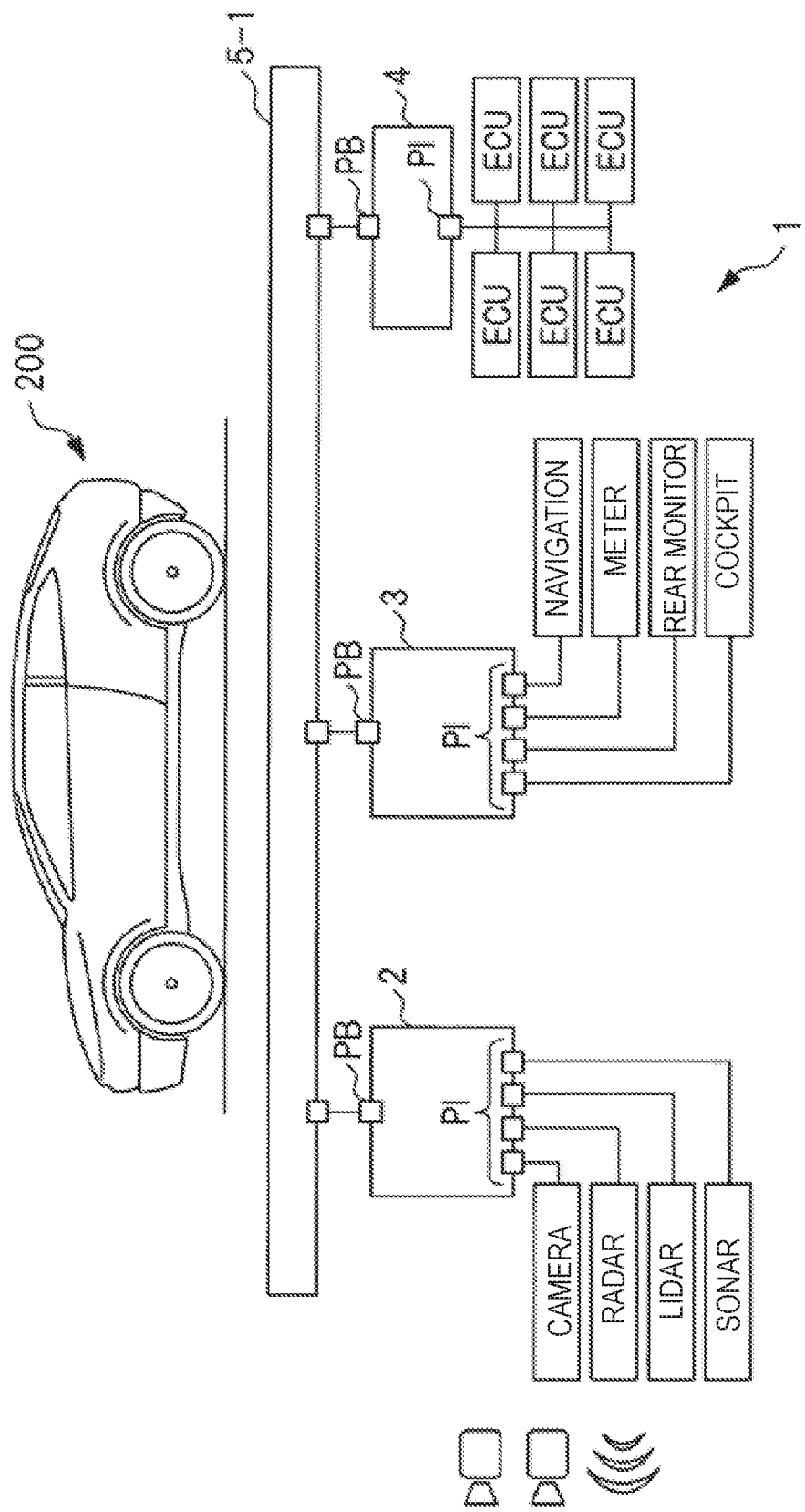
FIG. 1 is a diagram showing a configuration of a vehicle in which the communication system related to first embodiment is mounted.

Embodiments of the present invention will be described below with reference to the drawings. It is to be noted that the disclosure is merely an example, and those skilled in the art can easily conceive of appropriate changes while maintaining the gist of the invention are naturally included in the scope of the invention. In addition, although the drawings may schematically represent the width, thickness, shape, and the like of each portion as compared with actual embodiments for the sake of clarity of description, the drawings are merely an example and do not limit the interpretation of the present invention.

In this specification and each drawing, the same reference numerals are assigned to the same elements as those described above with reference to the preceding drawings, and detailed description thereof may be omitted as appropriate.

<Ethernet-TSN System>

Prior to the explanation of the embodiment, an Ethernet-TSN system will be first explained in order to make it easy to understand the present embodiment.

Figure 22:
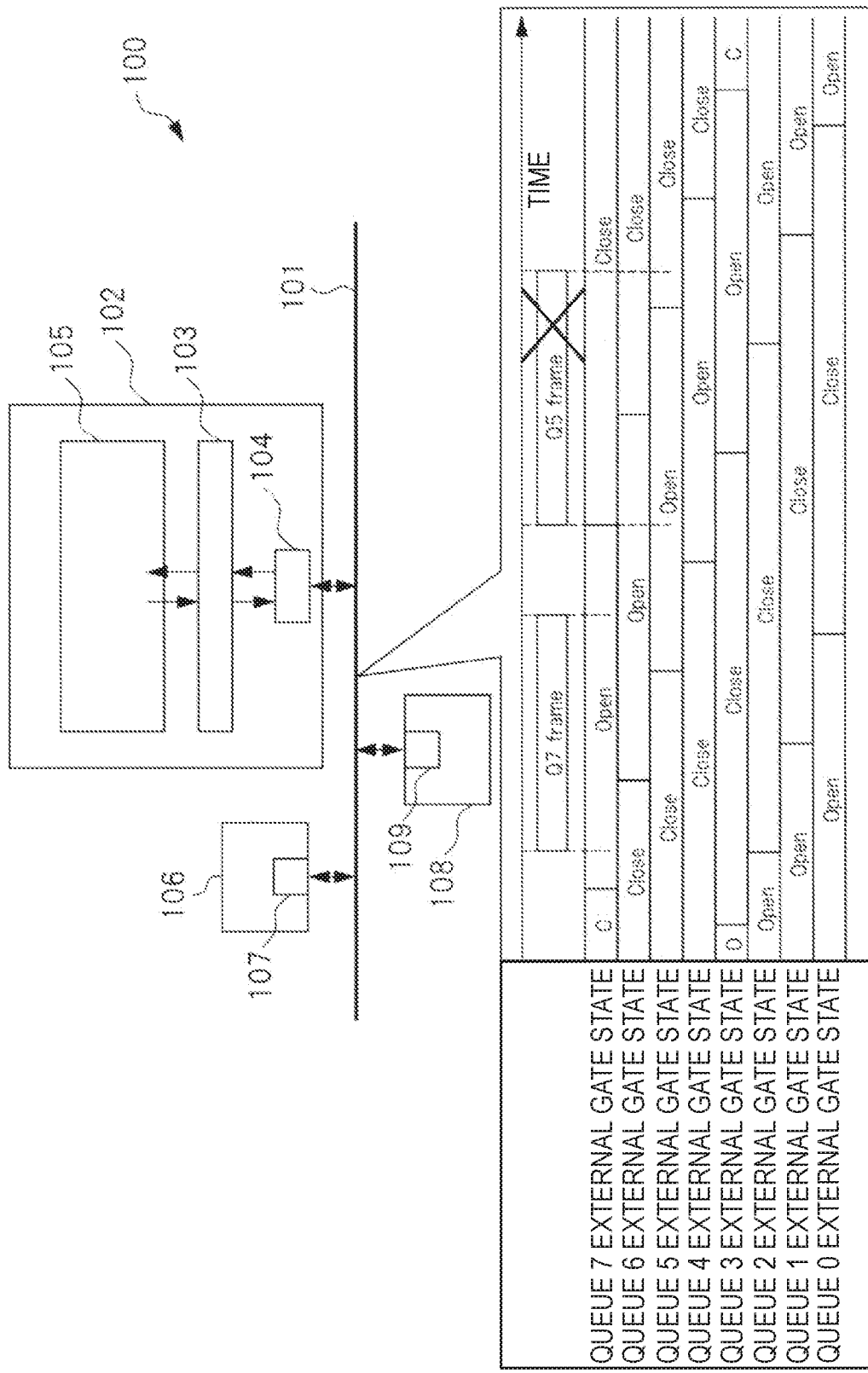
FIG. 22 is a diagram for explaining Ethernet-TSN systems.

FIG. 22 is a diagram for explaining Ethernet-TSN systems. In the Ethernet-TSN, a plurality of queues (Queue) are set, but here, eight queues are set. Each of the eight queues has an external gate state (Gate state), and the external gate state is configured by an open period (Open) and a close period (Close). In the period in which the external gate state is open, communication between device is permitted, and in the period in which the external gate state is closed, communication between device is not permitted.

In FIG. 22, the Ethernet-TSN system 100 includes an Ethernet (registered trademark) bus 101, and a processor 102 and sensors 106 and 108 connected to the Ethernet bus 101. The processor 102 includes an Ethernet-TSN controller (hereinafter referred to as a TSN controller) 105, input/output circuits 103, and an Ethernet PHY transceiver (hereinafter referred to as a transceiver) 104 connected to the Ethernet bus 101. The sensors 106 and 108 also include transceivers 107, 109 connected to the Ethernet bus 101.

The eight queues are set as queues 0 to 7. Although not particularly limited, priority is assigned to each queue. In the period in which the external gate state is open, when a plurality of communications overlap, communications in the queue having the higher priority are executed, and communications in the queue having the lower priority are not performed. Here, a case where a larger numerical value is allocated to a queue having a higher priority will be described. Therefore, the priority of the queue 7 is highest, and the priority of the queue 0 is lowest. Needless to say, the relationship between the priority order and the numerical value specifying the queue is not limited to this.

In FIG. 22, the external gate states corresponding to queue 0 to queue 7 are shown as queue 0 external gate state to queue 7 external gate state. For example, in the open period of the external gate state of the queue 7, the communication assigned to the queue 7 is allowed to be executed. Further, in the open period of the queue 0 external gate state, the communication assigned to the queue 0 is allowed to be executed. If the communication assigned to each queue is requested to be executed while the open period of the external gate state of the queue 7 and the open period of the external gate state of the queue 0 overlap, the communication assigned to the higher-priority queue 7 is executed via the Ethernet bus 101. The same applies to the remaining queues.

The processor 102 and the device such as the sensors 106 and 108 connected to the Ethernet bus 101 are provided with the clock generation circuit (not shown), and open period and close period in each queue external gate state are determined based on the time information outputted by the clock generation circuit provided in each device. The clock generation circuit included in each device is set to measure the same time when the communication system 100 is operated. As a result, the clock generation circuit of each device operates in synchronization with each other, and each device connected to the Ethernet bus 101 shares the open period and close period of the external gate state.

External gate state open period and close period are shared by each device to allow optimal scheduling for each application's responsiveness to be executed in the queues. FIG. 22 shows a case where a frame data Q7_frame caused by the application is communicated between the processor 102 and the sensor 108 by the application executed in the queue 7. As shown in FIG. 22, the communication of the frame data Q7_frame is performed in a period in which the external gate state of the queue 7 is open. In the open period, the TSN controller 105 and the sensor 108 transmit and receive the frame data Q7_frame via the input/output circuit 103, the transceivers 104, and the Ethernet bus 101.

FIG. 22 shows a case where communication of a frame data Q5_frame violating scheduling is performed. It is correct to schedule the frame data Q5_frame to be communicated to the queue 5 external gate state open period. However, in violation of the scheduling, as shown in FIG. 22, when the transmission and reception of the frame data Q5_frame is set to continue until the period of the close, the frame data Q5_frame is discarded, for example. This makes it possible to reduce interference with transmission and reception of data on the Ethernet bus 101 by the violated frame data Q5_frame.

Figure 23:
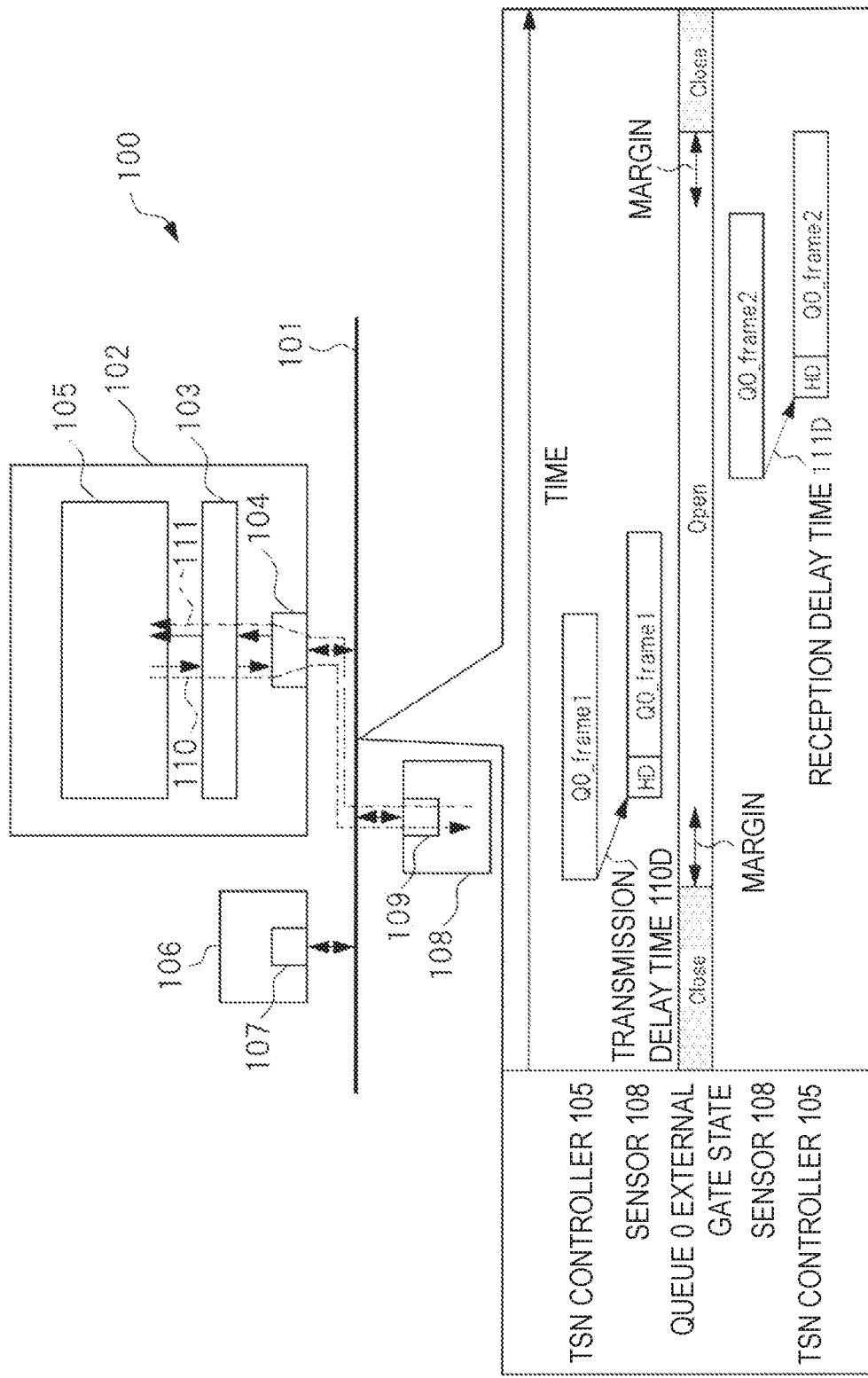
FIG. 23 is a diagram for explaining problems of Ethernet-TSN systems.

One external gate state is shared among the devices connected to the Ethernet bus 101 for each of the queues, but the open periods of the external gate states are required to have margins in view of latency times that occur when transmitting and receiving data. This will be explained with reference to the drawings. FIG. 23 is a diagram for explaining the problems of the Ethernet-TSN systems. In FIG. 23, the configuration of the Ethernet-TSN system 100 shown on the upper side of the paper is the same as that described in FIG. 22. In FIG. 23, the lower side of the drawing shows the transmission and reception of frame data between the sensor 108 and the processor 102 caused by the application executed in the queue 0.

The TSN controller 105 transmits a frame data Q0_frame1. The transmitted frame data Q0_frame1 is transmitted to the sensor 108 via the input/output circuit 103, the transceiver 104, and the Ethernet bus 101, as indicated by a broken line 110. The sensor 108 receives the transmitted frame data Q0_frame1 by the transceiver 109, and performs processing according to the received frame data Q0_frame1. Since a delay occurs in each of the input/output circuit 103, the transceiver 104, and the Ethernet bus 101, the transmission delay time 110D occurs from the time when the TSN controller 105 starts transmission of the frame data Q0_frame1 to the time when the TSN controller 102 transmits the frame data Q0_frame1 to the sensor 108.

Therefore, the open period of the Queue 0 external gate state needs to have started prior to the transmission of the frame data Q0_frame1 to the sensor 108. That is, as shown in FIG. 23, the open period is required to start with a margin with respect to the timing when the frame data Q0_frame1 is transmitted.

In addition, a frame data Q0_frame2 is transmitted from the sensor 108 to the processor 105. In this case, the frame data Q0_frame2 transmitted from the transceiver 109 of the sensor 108 is transmitted to the TSN controller 105 via the Ethernet bus 101, the transceiver 104, and the input/output circuit 103, and is received by the TSN controller 105, as indicated by the dashed-dotted line 111. Since a delay occurs in each of the input/output circuit 103, the transceiver 104, and the Ethernet bus 101, the frame data Q0_frame2 is transmitted to the TSN controller 105 after the reception delay time 111D is delayed from the timing when the sensor 108 starts transmitting the frame data Q0_frame2.

As a result, the open period is required to terminate after the sensor 108 has finished transmitting the frame data Q0_frame2. That is, as shown in FIG. 23, the open period needs to be finished with margins with respect to the time when the frame data Q0_frame1 is finished being transmitted by the sensor 108. In the figure, HD represents a header portion of the frame data.

The delay time generated in each of the input/output circuit 103, transceiver 104 and the Ethernet bus 101 depends on environmental changes, such as ambient temperatures. For this reason, both of the margins described above must be set assuming the delay time maxima that occur depending on environmental fluctuations. Larger margins lead to longer external gate state open period, longer sequences for transmitting and/or receiving the frame data, for example, between sensors and processors, and less efficient the communication systems.

First Embodiment

<Overall Configuration of Communication System>

FIG. 1 is a diagram showing a configuration of an automobile in which the communication system according to a first embodiment is mounted. In FIG. 1, reference numeral 200 denotes an automobile. The vehicle 200 is equipped with the communication system 1. The communication system 1 includes a device mounted on a vehicle, a switch controller corresponding to the device, and an Ethernet bus connected to the device via the switch controller. In FIG. 1, various sensors, various human interfaces, and ECUs (Engine Control Unit) are shown as a device mounted on a vehicle.

Examples of sensors include cameras, radars, Lidars and sonars. These sensors are connected to an Ethernet bus 5_1 via a switch controller 2. Examples of the human interface include a navigation device, a meter, a rear monitor, and a cockpit. These human interfaces are connected to the Ethernet bus 5_1 via a switch controller 3. Further, the plurality of ECUs is connected to the Ethernet bus 5_1 via a switch controller 4.

The switch controllers 2, 3, and 4 are provided with a port PB connected to the Ethernet bus 5_1, a port PI connected to the device, and the TSN controller, and as shown in the drawing, by connecting the Ethernet bus 5_1 to the port PB and connecting the device to the port PI, communication is enabled between the device and the Ethernet bus 5_1 via the switch controllers 2, 3, and 4. This enables communication between the device via the Ethernet bus 5_1.

In FIG. 1, a single switch controller 2 monitors and controls a plurality of sensors connected to the port PI. However, the switch controller corresponding to each of the sensors may be provided in the communication system 1, and the corresponding sensor may be monitored and controlled by each switch controller. Similarly, the communication system 1 may be provided with the switch controller corresponding to each of the human interface and the ECU, and each of the human interface and the ECU may be monitored and controlled by the corresponding switch controller.

<Overall Operation of Communication System>

Figure 2:
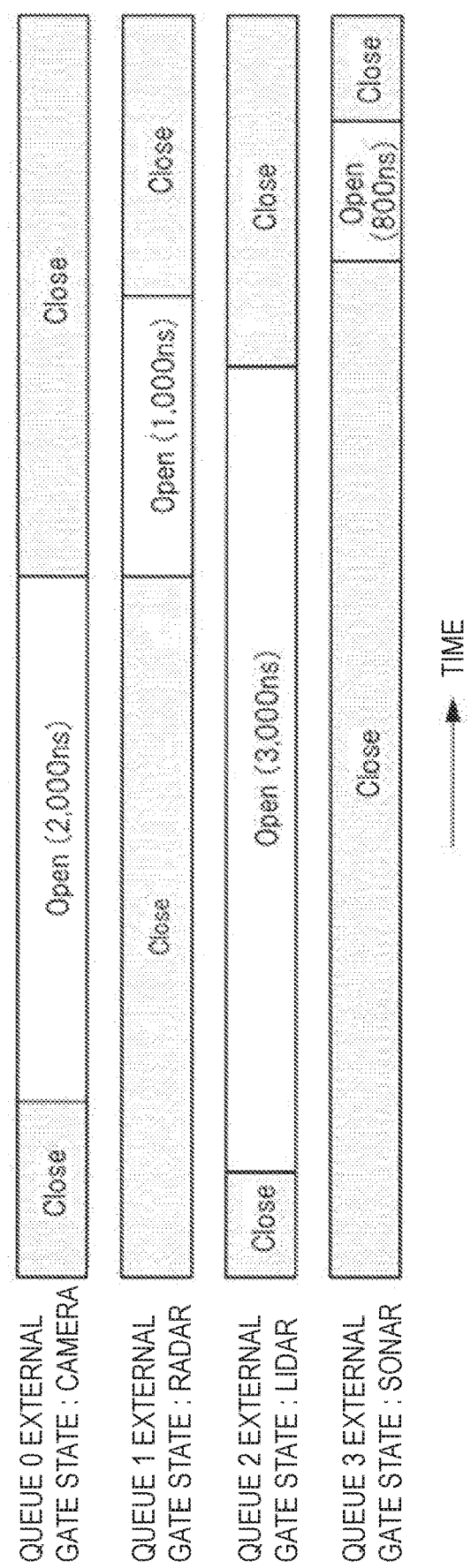
FIG. 2 is a diagram for explaining an operation of the communication systems related to first embodiment.

Next, the overall operation of the communication system 1 will be described with reference to the drawings. Here, a case where communication is performed between the sensor and the switch controller 2 will be described as an example. FIG. 2 is a diagram for explaining the operation of the communication systems related to first embodiment.

FIG. 2 shows four queue external gate states, queue 0 external gate state to queue 3 external gate state. Here, it is assumed that an application related to a camera is assigned to the queue 0, and an application related to the radar is assigned to the queue 1. It is also assumed that an application related to the lidar is assigned to the queue 2, and an application related to the sonar is assigned to the queue 3. When the applications assigned to the queues 0 to 3 are executed, in the open period of the external gate state corresponding to the queues, the communication caused by the process of the application is permitted, and in the close period, the communication is not permitted. Here, it is assumed that the open period of the queue 0 external gate state is set to 2,000 ns, the open period of the queue 1 external gate state is set to 1,000 ns, the open period of the queue 2 external gate state is set to 3,000 ns, and the open period of the queue 3 external gate state is set to 800 ns. Since it is possible to set the open time in which communication is possible for each sensor in this manner, it is possible to perform optimal scheduling for each sensor.

For example, communication is performed between the camera and the TSN controller in the switch controller 2 during a period in which the external gate state of the queue 0 is open, and communication is performed between the radar and the TSN controller during a period in which the external gate state of the queue 1 is open.

<Switch Controller>

Figure 3:
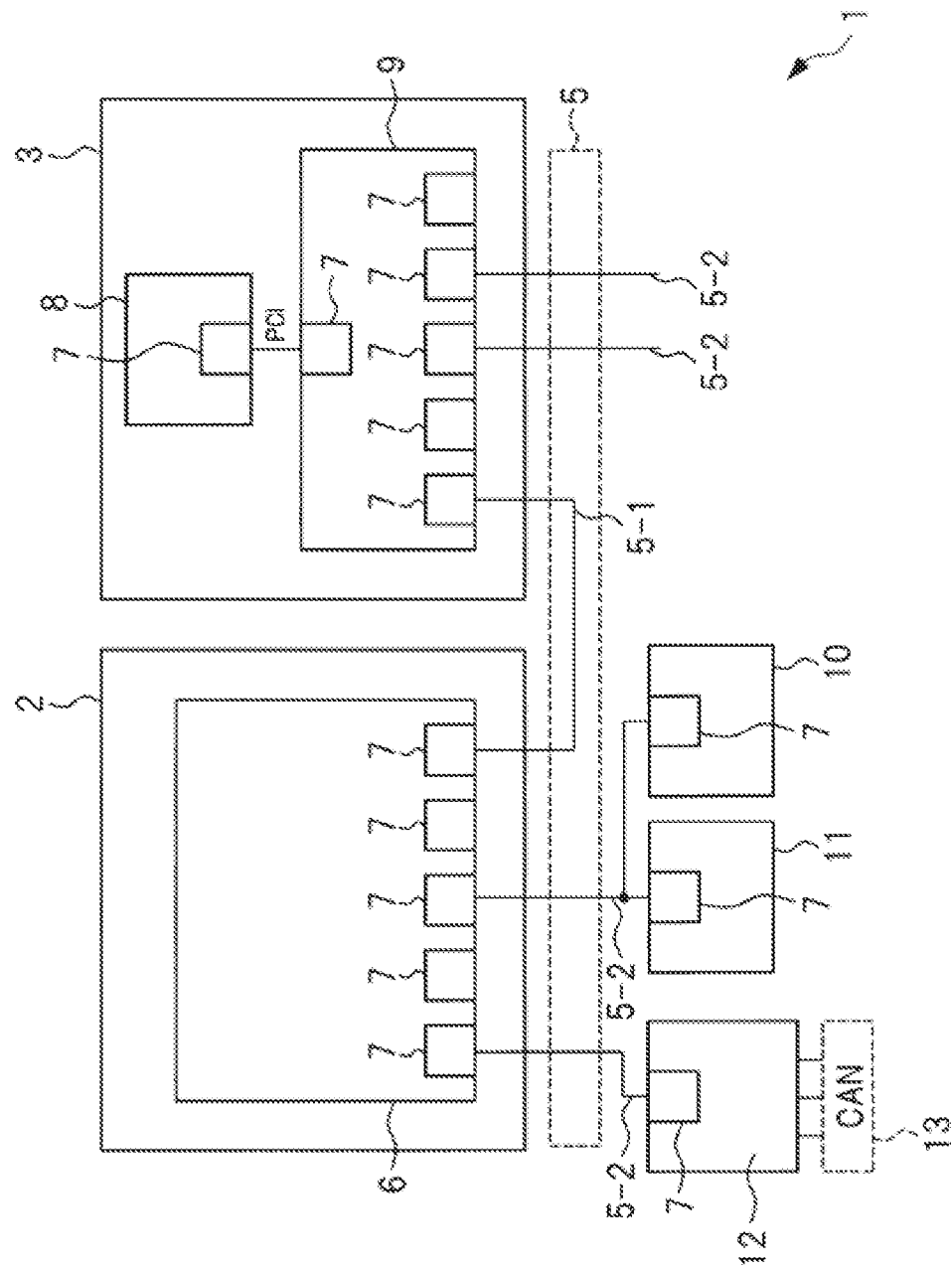
FIG. 3 is a block diagram showing a configuration of the communication system related to first embodiment.

FIG. 3 is a block diagram showing a configuration of the communication system according to the first embodiment. FIG. 3 shows a main portion of the communication system shown in FIG. 1. That is, FIG. 3 shows the switch controllers 2 and 3 shown in FIG. 1. In FIG. 3, the Ethernet bus 5_1 to which the switch controllers 2 and 3 shown in FIG. 1 are connected and an Ethernet bus 5_2 to which the switch controller and the device such as the sensor are connected are shown as the Ethernet bus 5. Although only a plurality of sensors is connected to the switch controller 2 in FIG. 1, a switch controller 12 for connecting a Controller Area Network 13 is also connected to the switch controller 2 in FIG. 3.

In FIG. 3, the switch controller 2 is composed of one semiconductor device 6. The switch controller 2 includes a plurality of transceivers 7, which will be described later in detail with reference to FIG. 4. The plurality of transceivers 7 include the transceiver 7 connected to the switch controller 3 via the Ethernet bus 5_1, the transceiver 7 connected a switch controller 12 via the Ethernet bus 5-2, and the transceiver 7 connected to sensors 10 and 11 via the Ethernet bus 5_2. The transceivers 7 of the sensors 10 and 11 are connected to the Ethernet bus 5_2 by a hub (not shown).

The switch controller 3 includes a plurality of the semiconductor devices, although the switch controller 3 is not particularly limited. In FIG. 3, the switch controller 3 is composed of a processor 8 and a TSN controller 9 each composed of one semiconductor device. The TSN controller 9 also comprises a plurality of transceivers 7. The plurality of transceivers 7 include a transceiver 7 connected to the processor 8 by a Peripheral Component Interconnect (PIC) bus, a transceiver 7 connected to the switch controller 2 via the Ethernet bus 5_1, and a transceiver 7 connected to a human interface such as the navigation device shown in FIG.

1 via the Ethernet bus 5_2. In the switch controller 3, the switch controller 3 including the TSN controller 9 is controlled by the processor 8.

In FIG. 3, an example in which the sensors 10 and 11 and the switch controller 12 are connected to the switch controller 2 is shown, but the present invention is not limited thereto. That is, the sensors 10 and 11 and the switch controller 12 may be connected to the switch controller 3.

<Configuration of TSN Controller>

Figure 4:
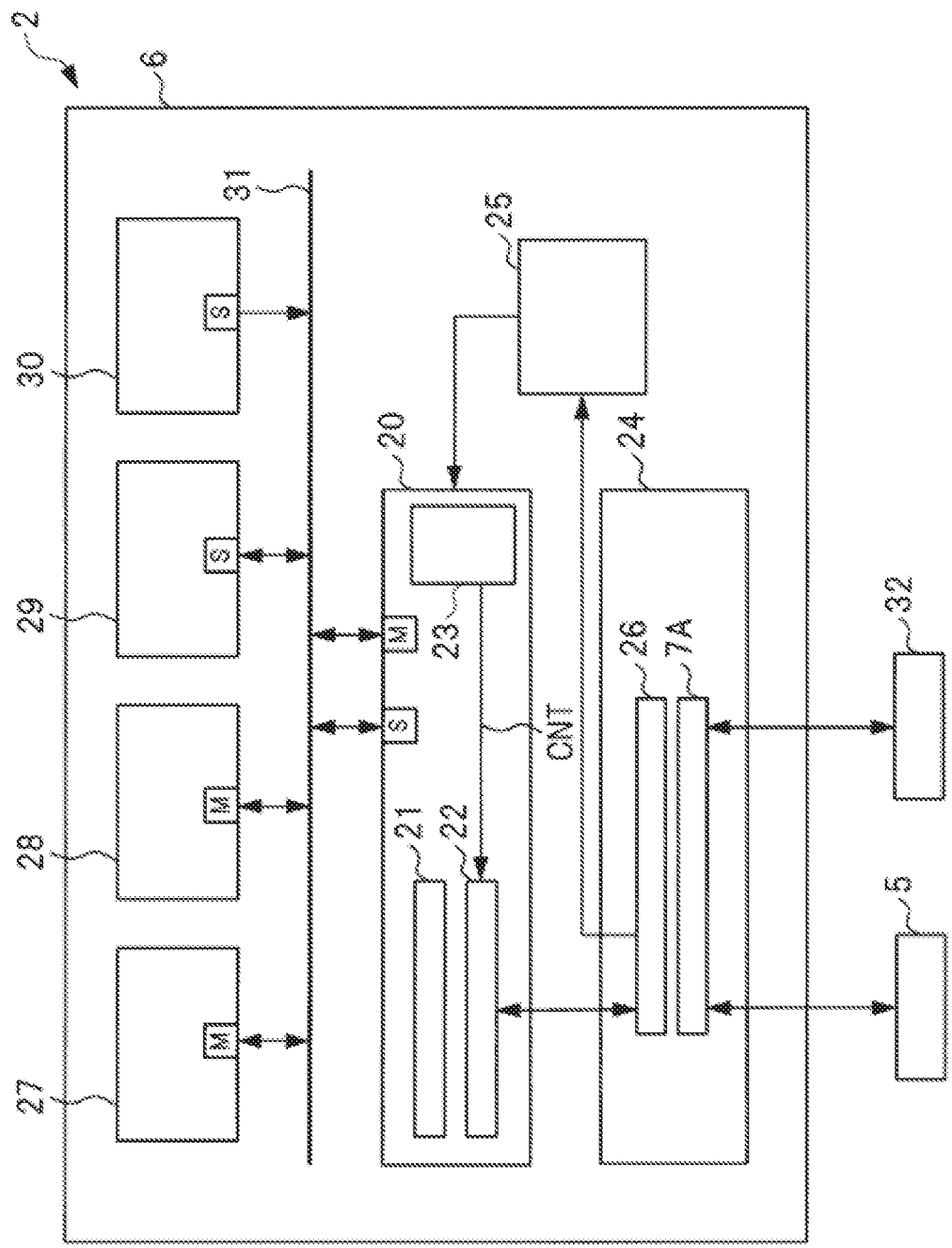
FIG. 4 is a diagram showing a configuration of controllers related to first embodiment.

FIG. 4 is a block diagram showing a configuration of a controller according to the first embodiment. FIG. 4 shows the configuration of the switch controller 2 shown in FIG. 3.

The switch controller 2 includes a TSN controller 20, input/output circuits 24, a clock generation circuit 25, a processor 27, a DTC/DMA controller 28, a global memory 29, a flash memory 30, and an internal bus 31. The TSN controller 20, the processor 27, the DTC/DMA controller 28, the global memory 29, and the flash memory 30 are connected to the internal bus 31. In the figure, the symbol M represents a master node, and the symbol S represents a slave node.

In case of the processor 27 and the DTC/DMA controller 28 function as a bus master, they access the global memory 29, the flash memory 30, or the slave node S of the TSN controller 20 from the master node M via the internal bus 31. Although not particularly limited, the function of the switch controller 2 is achieved by the processor 27 reading and executing the program of the application.

The input/output circuit 24 include a transceiver unit 7A including the plurality of transceivers 7, and an input/output unit 26. The transceiver unit 7A comprises the plurality of transceivers 7 shown in FIG. 3. The transceiver unit 7A also includes the transceiver 7 connected to external interfaces 32. The transceiver unit 7A outputs the data transmitted from the Ethernet bus 5 to the TSN controller 20 and the clock generation circuit 25 via the input/output unit 26. The data supplied from the TSN controller 20 to the input/output circuit 24 is supplied to the transceiver unit 7A via the input/output unit 26, and the data is transmitted from the transceiver unit 7A to the Ethernet bus 5.

The clock generation circuit 25 measures the time and supplies a time information representing the time to the TSN controller 20. For example, when power is supplied to the switch controller 2, the time of the clock generation circuit 25 is adjusted in accordance with the data supplied from the input/output circuit 24. That is, the clock generation circuit 25 is controlled so that the time to be measured and the time notified via the Ethernet bus 5 are synchronized and the same time is measured. The times measured by the clock generation circuit 25 define the external gate states open period and close period.

The TSN controller 20 includes a setting register 21, a buffer 22, and a control unit 23. The TSN controller 20 operates as a bus master and a bus slave. In case of the TSN controller 20 is operated as a bus slave and the processor 27 writes time information to the setting register 21, the TSN controller 20 sets time information to the setting register 21.

The buffer 22 stores the frame data to be transmitted supplied via the internal bus 31 and the reception frame data supplied from the input/output circuit 24. In FIG. 4, the transmission frame data and the reception frame data to be transmitted are illustrated as being stored in the same buffer, but the present invention is not limited thereto. That is, the TSN controller 20 may be provided with a first buffer for storing transmission frame data and a second buffer for storing the reception frame data.

The control unit 23 specifies the external gate states open period and close period for each of the queues based on the time information from the clock generation circuit 25. In addition, the control signal CNT controls the buffer 22 by the control signal CNT based on the specified starting time and ending time of the open period and the time information set in the setting register 21.

In the first embodiment, the period during which the transmission frame data stored in the buffer 22 is allowed to be transmitted to the input/output circuit 24 is set to the open period of the internal gate state. In other words, the period during which the transmission of the transmission frame data stored in the buffer 22 to the input/output circuit 24 is not permitted is the period during which the transmission of the transmission frame data stored in the buffer 22 to the input/output circuit 24 is close period of the internal gate state. The control unit 23 obtains the starting time and the ending time of the open period of the inner gate state on the basis of the open period of the outer gate state determined by the clock generation circuit 25 and the time information set in the setting register 21, and controls the buffers 22 by the control signals CNT. In this manner, the TSN controller 20 can transmit the transmission frame data in the open period of the inner gate state which differs from the open period of the outer gate state defined by the clock generation circuit 25. The control of the buffer 22 will be described in detail with reference to FIGS. 5 to 15.

The switch controller 3 shown in FIG. 3 has the TSN controller 20, the input/output circuit 24, and the clock generation circuit 25 shown in FIG. 4.

<Operation of TSN Controller>

Figure 5:
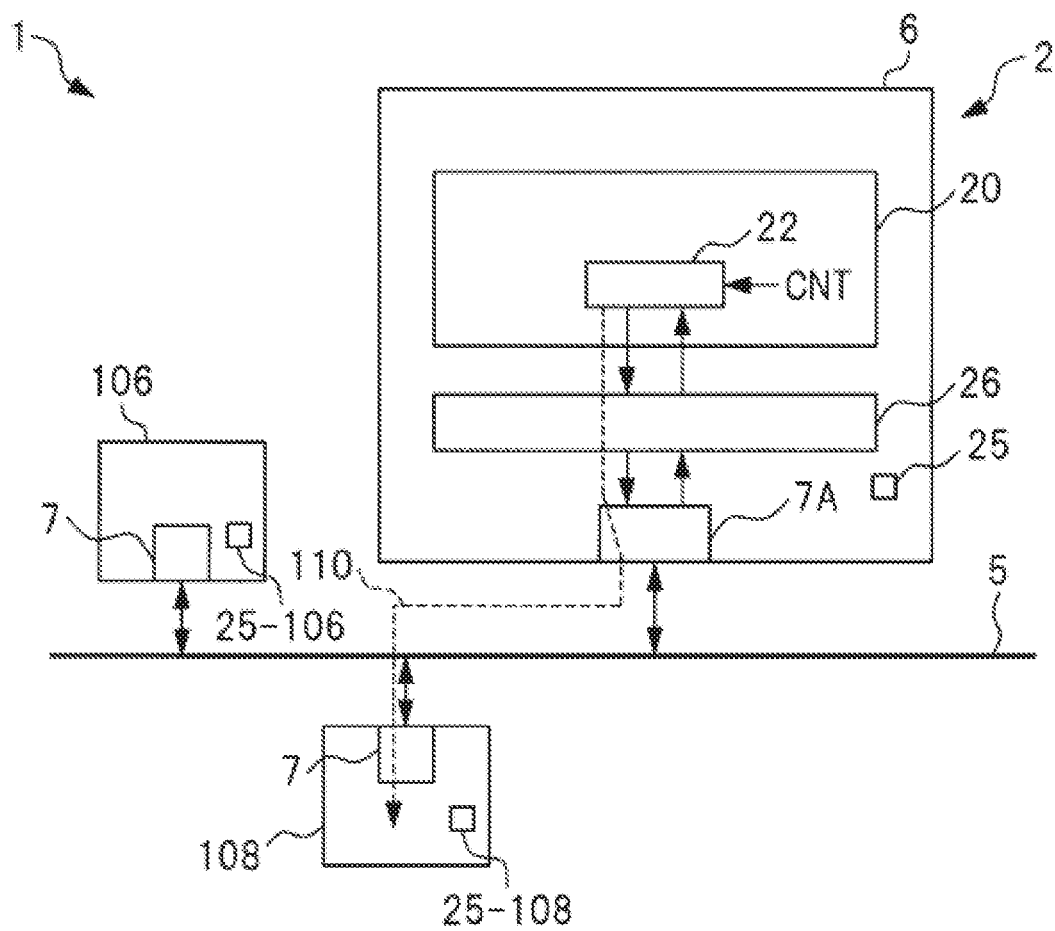
FIG. 5 is a diagram for explaining an operation of a TSN controller related to first embodiment.

FIG. 5 is a diagram for explaining the operation of the TSN controller according to the first embodiment. FIGS. 6 to 9 are timing diagrams for explaining the operation of the TSN controller related to the first embodiment. For ease of understanding, the operation of the TSN controller will be described in the communication system having a configuration similar to that of the communication system described above with reference to FIGS. 22 and 23. Therefore, the communication system 1 shown in FIG. 5 is similar to the communication system 100 shown in FIG. 23. The difference is that the processor 102 has been changed to the switch controller 2, the code of the Ethernet bus has been changed from 101 to 5, and the code of the transceivers of sensors 106, 108 has been changed from 107, 109 to 7. As shown in FIG. 4, the switch controller 2 also includes circuit blocks other than the TSN controller 20, the clock generation circuit 25, and the input/output circuit 24, but FIG. 5 shows the TSN controller 20, the clock generation circuit 25, and the input/output circuit. The input/output circuits include the input/output unit 26 and the transceiver unit 7A which constitute the input/output circuit. Furthermore, in FIG. 5, only the buffer 22 provided in the TSN controller 20 is clearly shown.

Although omitted from FIG. 23, each of the sensors 106 and 108 includes clock generation circuits 25_106 and 25_108 similar to the switch controller 2. The sensors 106 and 108 are also provided with external gate states as is switch controller 2. The open period and close period of external gate state of the sensor 106 are determined by the times measured by the clock generation circuit 25_106. The sensor 106 is allowed to transmit and receive data, i.e., to communicate, when the external gate state is open period, which is defined by the clock generation circuit 25_106, and is not allowed to communicate when the external gate state is close period. Similar to the sensor 106, the sensor 108 is allowed to communicate when the external gate state determined by the clock generation circuit 25_108 is open period, and is not allowed to communicate when the external gate state is close period.

The clock generation circuits 25_106 and 25_108 are timed in advance so as to measure the same time as the clock generation circuit 25 of the switch controller 2. As a result, the external gate states open period and close period are shared between the switch controller 2 and the sensors 106 and 108. That is, the period in which the external gate state of the switch controller 2 is open overlaps the period in which the external gate states of the sensors 106 and 108 are open. Similarly, the period in which the external gate state of the switch controller 2 is closed overlaps the period in which the external gate states of the sensors 106 and 108 are closed.

<Transmitting Frame Data>

Figure 6:
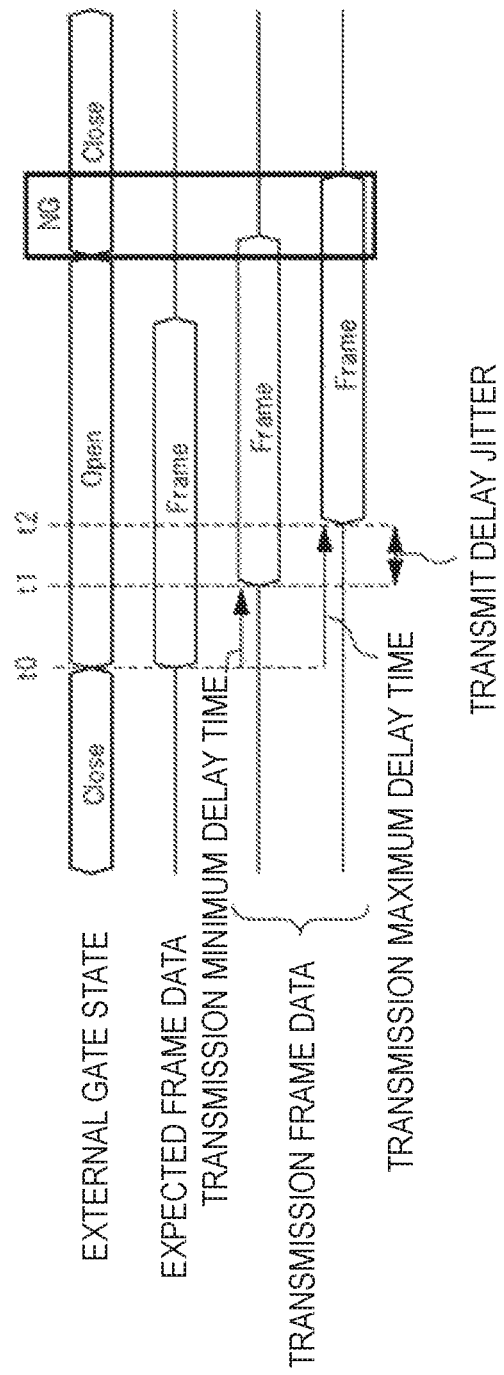
FIG. 6 is a timing chart for explaining the operation of the TSN controller related to first embodiment.

FIG. 6 is a timing chart when the processor 102 transmits the frame data to the sensor 108 in the communication system 100 shown in FIG. 23. When the TSN controller 105 (FIG. 23) starts transmitting the frame data as expected frame data at time t0 at which the open period of the external gate state starts, the frame data is delayed because there is a transmission delay time as described with reference to FIG. 23, and the frame data reaches the sensor 108 from time t1 to time t2. Since the transmission delay time fluctuates depending on environmental fluctuations, the time at which the frame data arrives at the sensor changes. Here, is case of the delay is the smallest, it is transmission minimum delay time, and the frame data reaches the sensor 108 at time t1. On the other hand, when the delay is the largest, it is transmission maximum delay time, and the frame data reaches the sensor 108 at time t2. The transmission delay time difference between transmission maximum delay time and transmission minimum delay time will be the transmit delay jitter, and within this transmit delay jitter the frame data will reach the sensor 108.

Since the time at which the head data of the frame data reaches the sensor 108 is delayed, the time at which the last data of the frame data reaches the sensor 108 is also delayed. When the arrival time of the last data of the frame data overlaps with the subsequent close period, receive is not permitted, so that the frame data that the TSN controller 105 has started transmitting at time t0 becomes invalid (NG), and the sensor 108 discards the frame data, for example.

In first embodiment, the processor 27 sets transmission minimum delay time, transmission maximum delay time and transmit delay jitter as time information in the setting register 21. The control unit 23 obtains the start time t0 of the open period of the external gate state from the transmission minimum delay time, transmission maximum delay time and the transmission delay jitter set in the setting register 21 and the time information from the clock generation circuit 25, and controls the buffer 22 by the control signal CNT so that the buffer 22 is opened earlier than the obtained start time t0 by a time corresponding to transmission minimum delay time. As a result, the open period of the internal gate state starts at the time tp1 as shown in FIG. 7.

In addition, the control unit 23 obtains the end time t3 of the open period of the external gate state from the time information from the clock generation circuit 25, and controls the buffer 22 by the control signal CNT so that the buffer 22 is closed earlier than the obtained end time t3 by the time of the sum of the time corresponding to transmission minimum delay time and the time corresponding to the transmit delay jitter. As a result, the open period of the internal gate state ends at the time tp3 as shown in FIG. 7. Since the sum of the time corresponding to the transmission minimum delay time tp2 to t3 and the time corresponding to the transmission delay jitter tp2 to tp3 is the time corresponding to transmission maximum delay time, the control unit 23 may control the buffer 22 to advance the end time of the internal gate state open period by the time corresponding to transmission maximum delay time with respect to the end time t3 of the external gate state.

Figure 7:
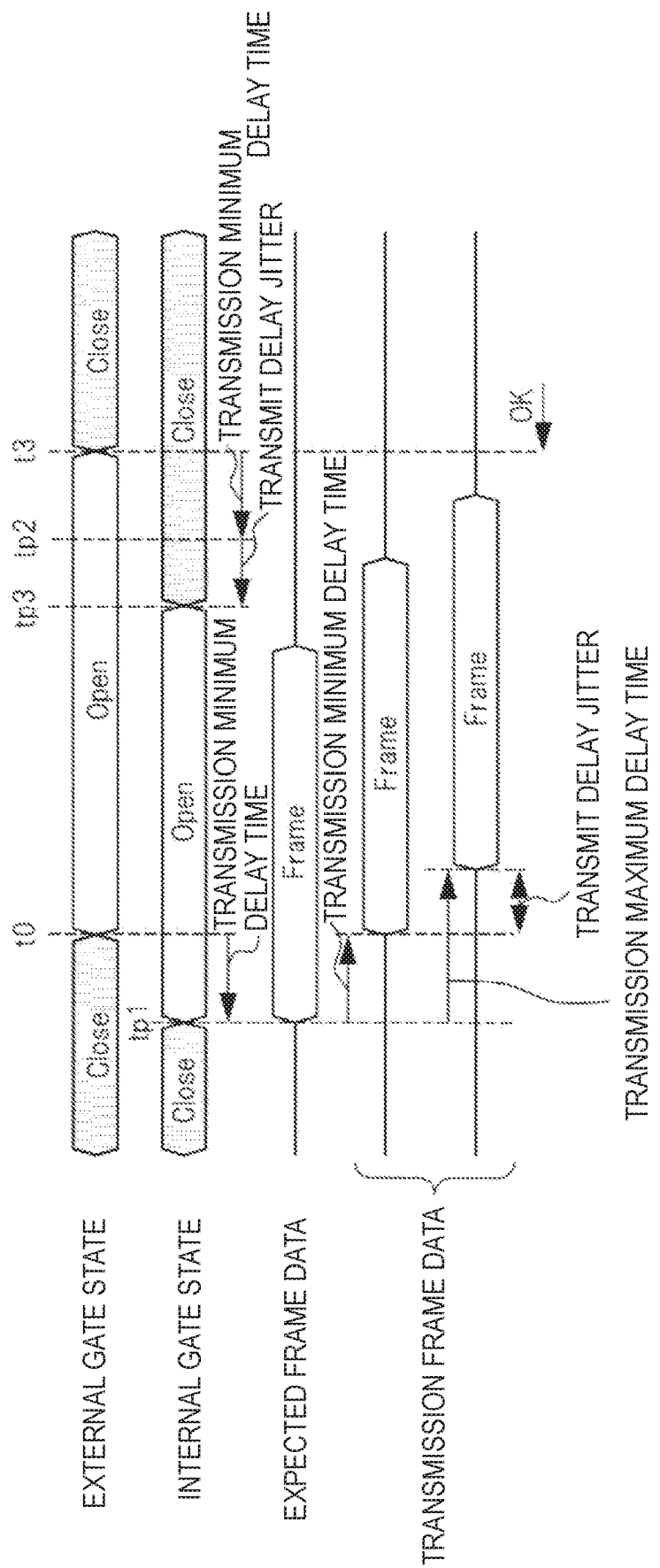
FIG. 7 is a timing chart for explaining the operation of the TSN controller related to first embodiment.

As a result, as shown in FIG. 7, the TSN controller 20 can start transmission of the frame data stored in the buffer 22 as expected transmission frame data at the time tp1. If delay time is transmission minimum delay time, the head data of the frame data reaches the sensor 108 at time t0. Even if the transmission delay time is transmission maximum delay time, the head of the frame data reaches the sensor 108 at a time delayed from the time t0 by a time corresponding to the transmission delay jitter.

The open period of the inner gate state ends at time tp3, while the open period of the outer gate state ends at time t3. Therefore, as shown in FIG. 7, even if the transmit delay time is transmission maximum delay time, the last data of the frame data reaches the sensor 108 prior to the time t3. As a result, it is possible to prevent (OK) the frame data from being processed as invalid.

Figure 8:
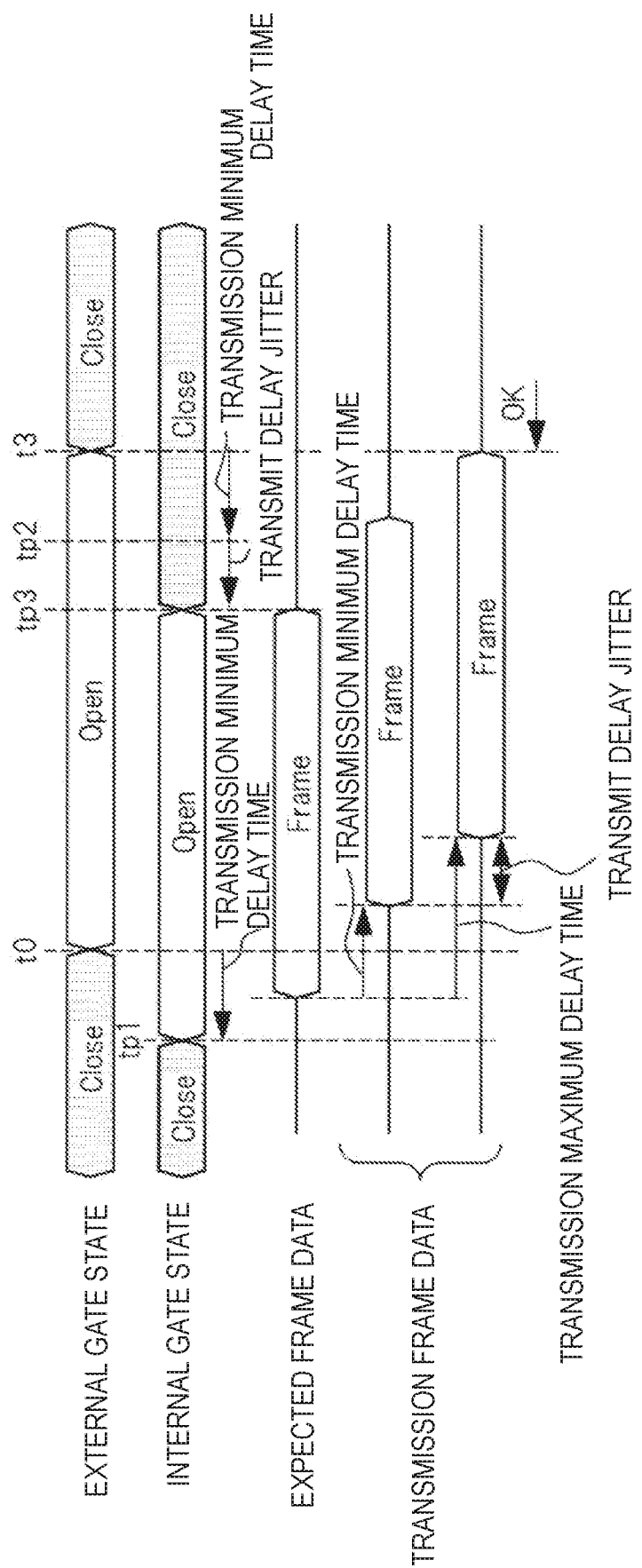
FIG. 8 is a timing chart for explaining the operation of the TSN controller related to first embodiment.

FIG. 8 shows the TSN controller 20 starting transmission of the frame data later than the open period starting time of the TSN controller 20. That is, the TSN controller 20 starts to transmit the transmission frame data stored in the buffer 22 as expected frame data at a time between the start time tp1 of the inner gate state open period and the start time t0 of the outer gate state open period. Again, when the last transmission of data of the expected frame data has been completed by time tp3, the transmit frame data will reach the sensor 108 during the open period of the external gate state, as shown in FIG. 8, thereby preventing the transmission frame data from being processed as invalid.

Figure 9:
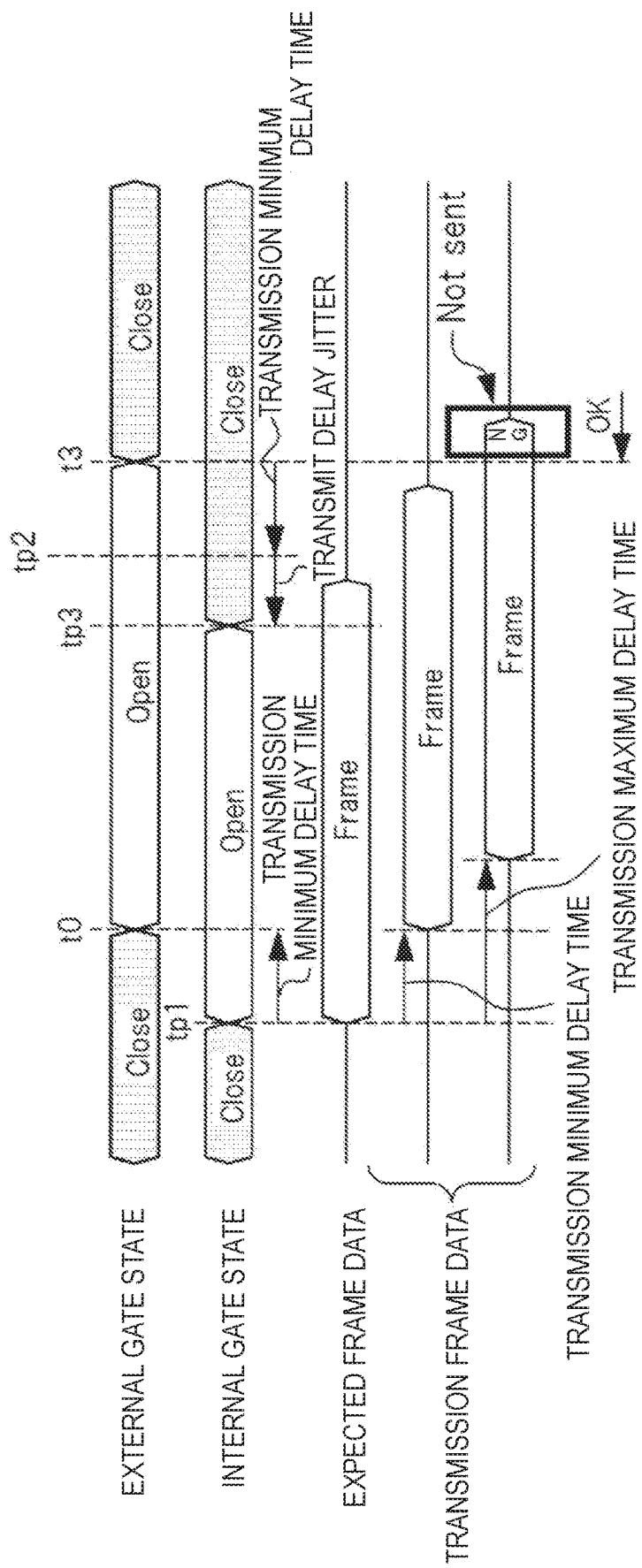
FIG. 9 is a timing chart for explaining the operation of the TSN controller related to first embodiment.

FIG. 9 shows a case in which the TSN controller 20 starts transmission of the expected frame data at the same time as the TSN controller 20 starts the open period start time tp1 of the internal gate state in the same manner as the TSN controller 20 shown in FIG. 7. However, FIG. 9 shows a case in which the data length of the transmission frame data is longer than that of FIG. 7, and the transmission frame data is longer than the open period of the internal gate state. In this case, when the transmission delay time from the TSN controller 20 to the sensor 108 is transmission minimum delay time, the transmission frame data can reach the sensor 108 by time t3. However, when the sum of the data length of the transmission frame data and the transmission delay jitter exceeds the open period time of the external gate state, the final data of the transmission frame data will reach the sensor 108 after time t3.

Also when the transmission delay time is transmission maximum delay time, as shown in FIG. 9, the final data of the transmission frame data reaches the sensor 108 after time t3. When the final data reaches the sensor 108 after time t3, the control unit 23 controls the buffer 22 by the control signal CNT so as not to transmit the transmission frame data from the buffer 22 to the input/output unit 26, as will be described later with reference to FIG. 10. In the first embodiment, the TSN controller 20 can prevent the TSN controller 20 from transmitting the transmission frame data that is invalid.

Figure 10:
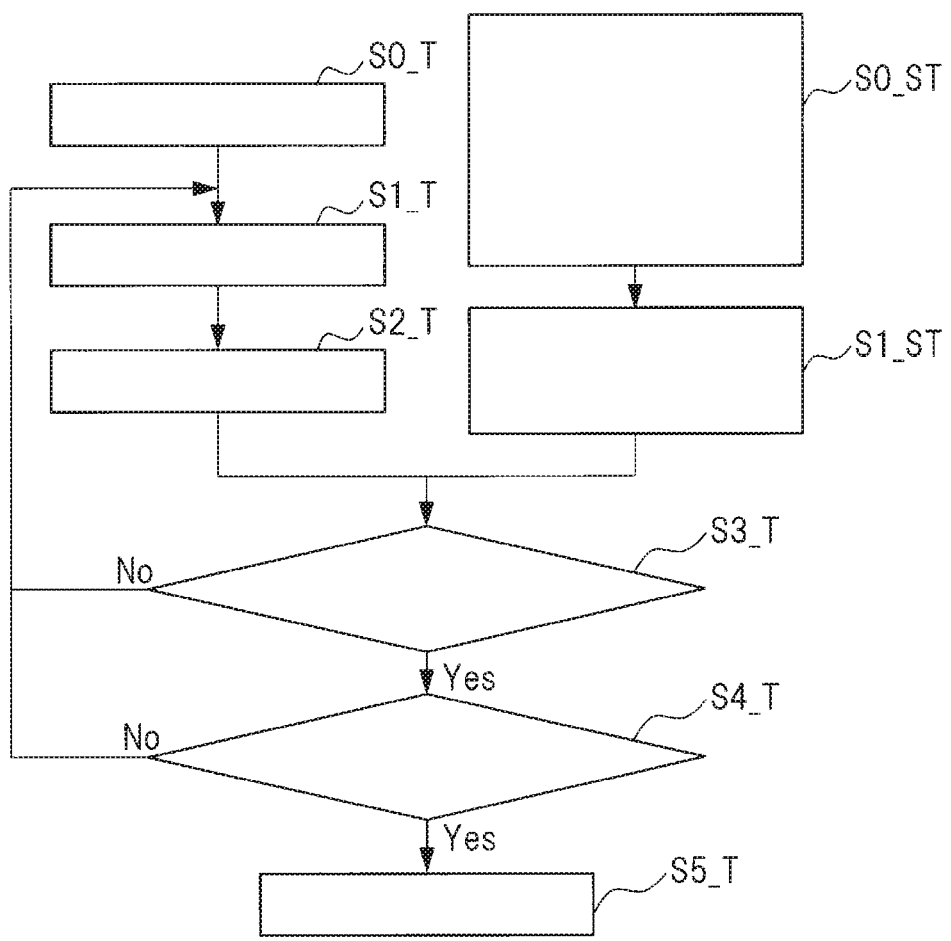
FIG. 10 is a flow chart showing the operation of the TSN controller related to first embodiment.

FIG. 10 is a flow chart showing the operation of the TSN controller 20 related to the first embodiment.

In step S0_ST, the processor 27 sets the external gate states open period and close period, the external gate states transmission maximum delay time, the transmission delay jitter transmission minimum delay time, and the transmission delay jitter time information in the setting register 21. The setting register 21 can be regarded as delay time setting unit because the setting register 21 is set with the data related to delay time.

In step S1_ST, the control unit 23 generates an external gate state and an internal gate state for each of the queues based on the time information set in the setting register 21 and the time information from the clock generation circuit 25. That is, the control unit 23 obtains the times t0 and t3 shown in FIGS. 7 to 9 as the external gate state, and obtains the time tp1 to tp3 shown in FIGS. 7 to 9 as the internal gate state.

In step S0_T, the TSN controller 20 receives a frame data transmission trigger from, for example, the processor 27. Next, in step S1_T, the TSN controller 20 enters a standby state for transmitting the frame data. Although not particularly limited, in step S1_T, the frame data to be transmitted is written in the buffer 22 by, for example, the processor 27. In step S2_T, the control unit 23 calculates the data length of the transmission frame data based on the frame data stored in the buffer 22.

Next, in step S3_T, the control unit 23 determines whether or not the internal gate state is open period based on the internal gate state generated in step S1_ST and the time information from the clock generation circuit 25, and further determines whether or not the process of step S2_T ends and the transmission of the frame data can be started. If the control unit 23 determines that the internal gate state is open period and the transmission of the frame data is enabled, the control unit 23 executes step S4_T; otherwise, the control unit 23 executes the process of step S1_T.

In step S4_T, based on the data length of the frame data calculated in step S2_T, the control unit 23 determines whether or not the frame data can be transmitted before the external gate state is closed. In step S4_T, as described with reference to FIG. 9, the control unit 23 obtains the sum of the data length and the transmission delay jitter, and determines whether or not the obtained sum exceeds the open period of the external gate state. If it is determined in step S4_T that the frame data can be transmitted before the external gate state is closed, the control unit 23 executes step S5_T. On the other hand, when it is determined in step S4_T that the frame data cannot be transmitted before the external gate state is closed, the control unit 23 executes the process of step S1_T. This makes it possible to prevent transmission of illegal transmission frame data.

In step S5_T, the control unit 23 opens the buffer 22. That is, the control unit 23 controls the buffer 22 by the control signal CNT so that the frame data stored in the buffer 22 is transmitted to the input/output circuit 24 as transmission frame data. As a result, the transmission of the transmission frame data starts, that is, data is sequentially transmitted from the head data of the transmission frame data to the last data.

Although not shown in FIG. 10, after the transmission of the frame is started in step S5_T, the control unit 23 controls the buffer 22 by the control signal CNT so that the buffer 22 does not transmit the transmission frame data to the input/output circuit 24 at the time tp3 shown in FIGS. 7 to 9.

According to the first embodiment, when the frame data is transmitted, margins are not set in the open period of the external gate state, so that the efficiency of the communication system can be improved.

Second Embodiment

Second embodiment provides the communication systems that can be more efficient when receiving the frame data. In the second embodiment, the TSN controller 20 of the communication system 1 described in first embodiment is modified so that the TSN controller 20 can improve the efficiency even when the TSN controller 20 receives the frame data.

Figure 11:
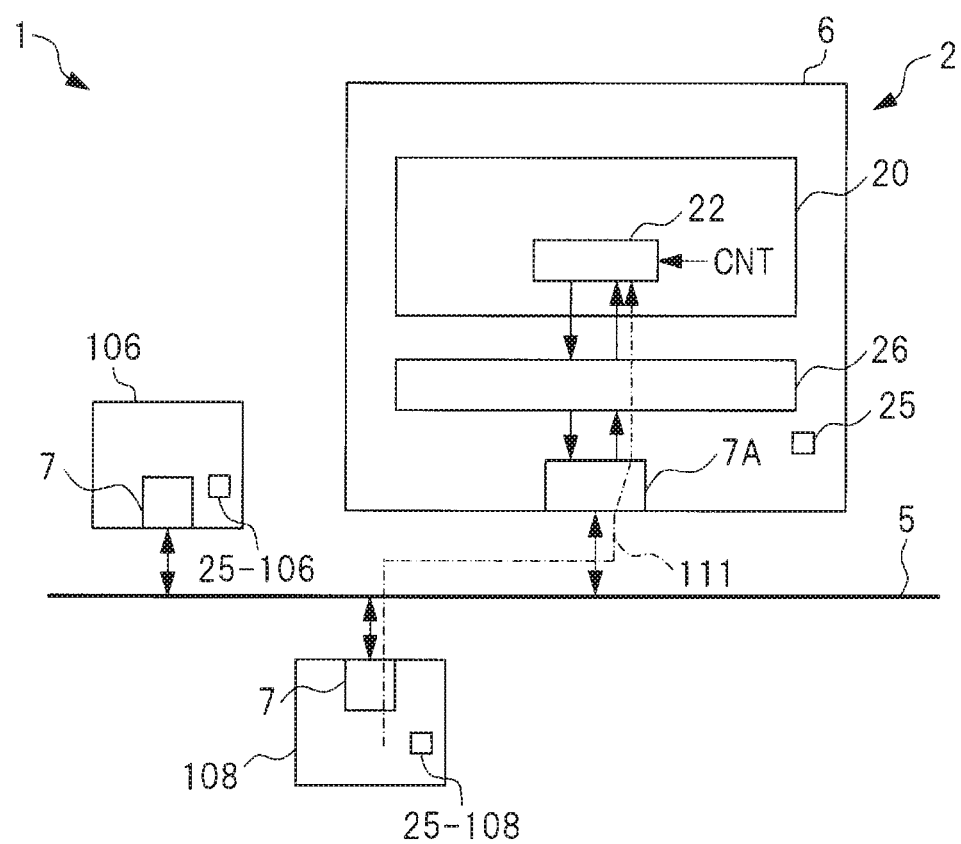
FIG. 11 is a diagram for explaining an operation of the TSN controller related to second embodiment.
Figure 12:
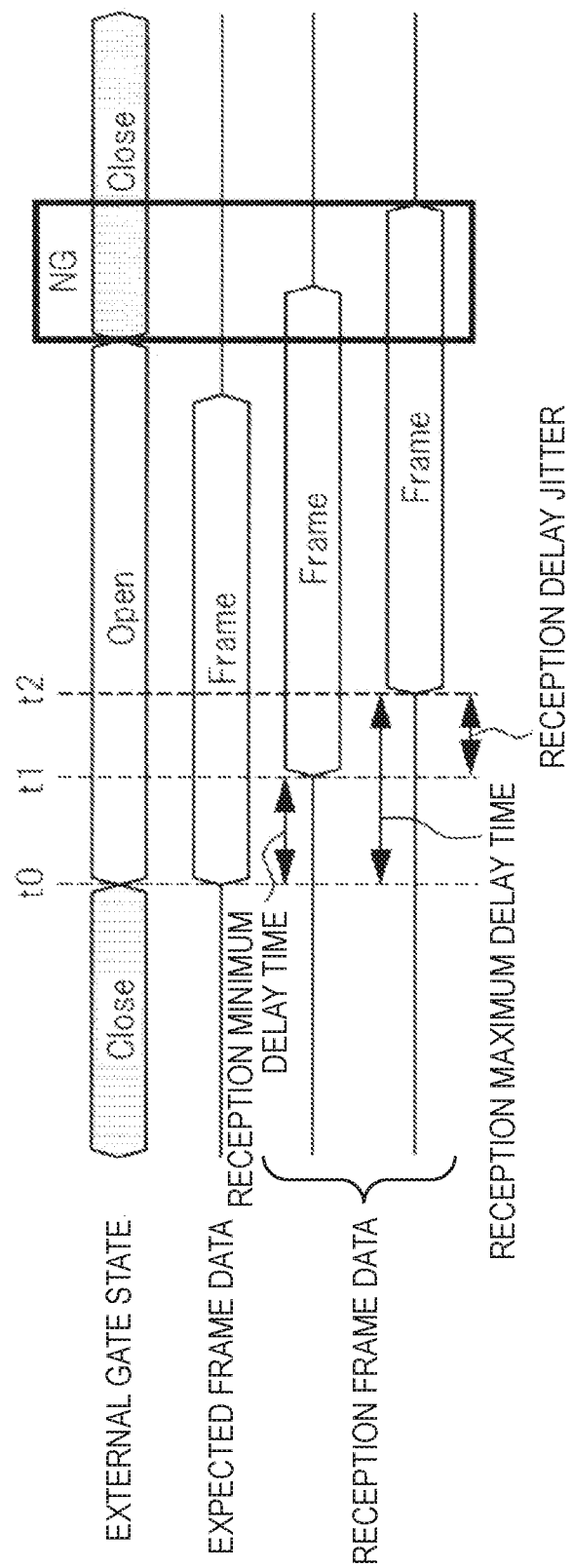
FIG. 12 is a timing chart for explaining the operation of the TSN controller related to second embodiment.
Figure 13:
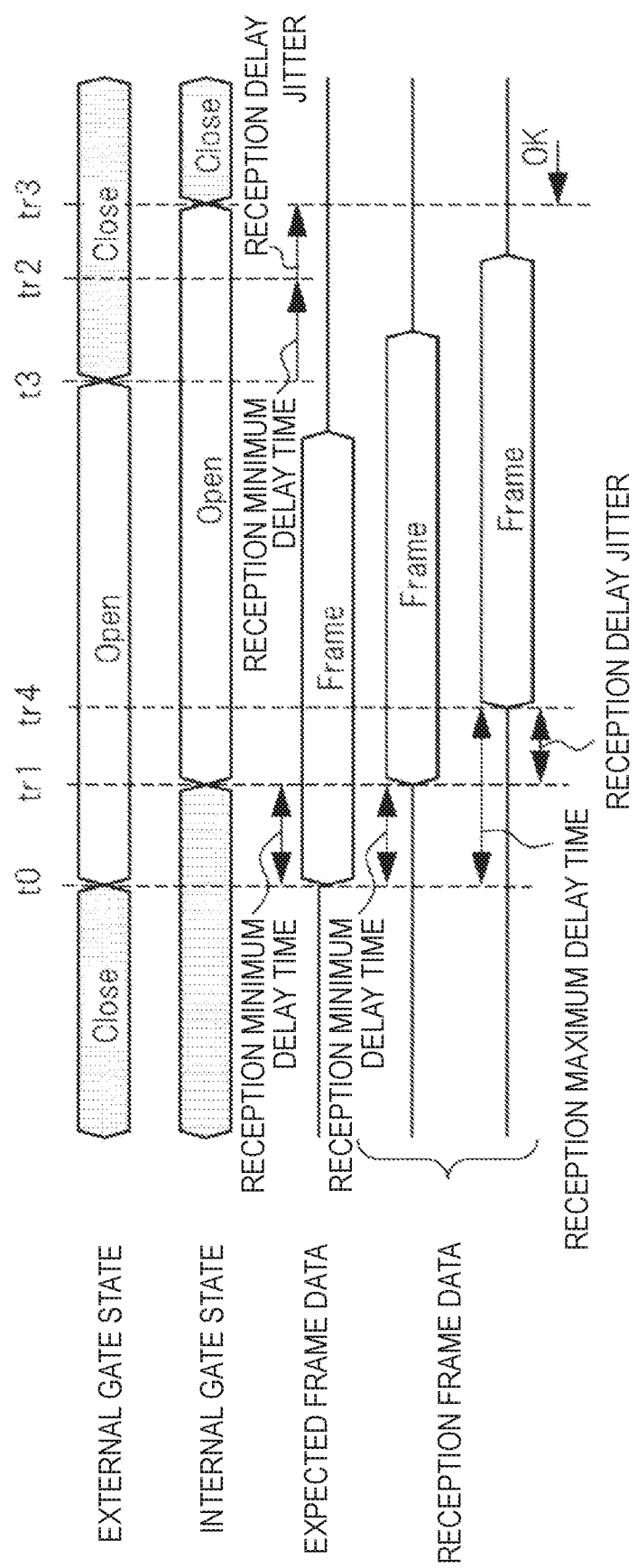
FIG. 13 is a timing chart for explaining the operation of the TSN controller related to second embodiment.
Figure 14:
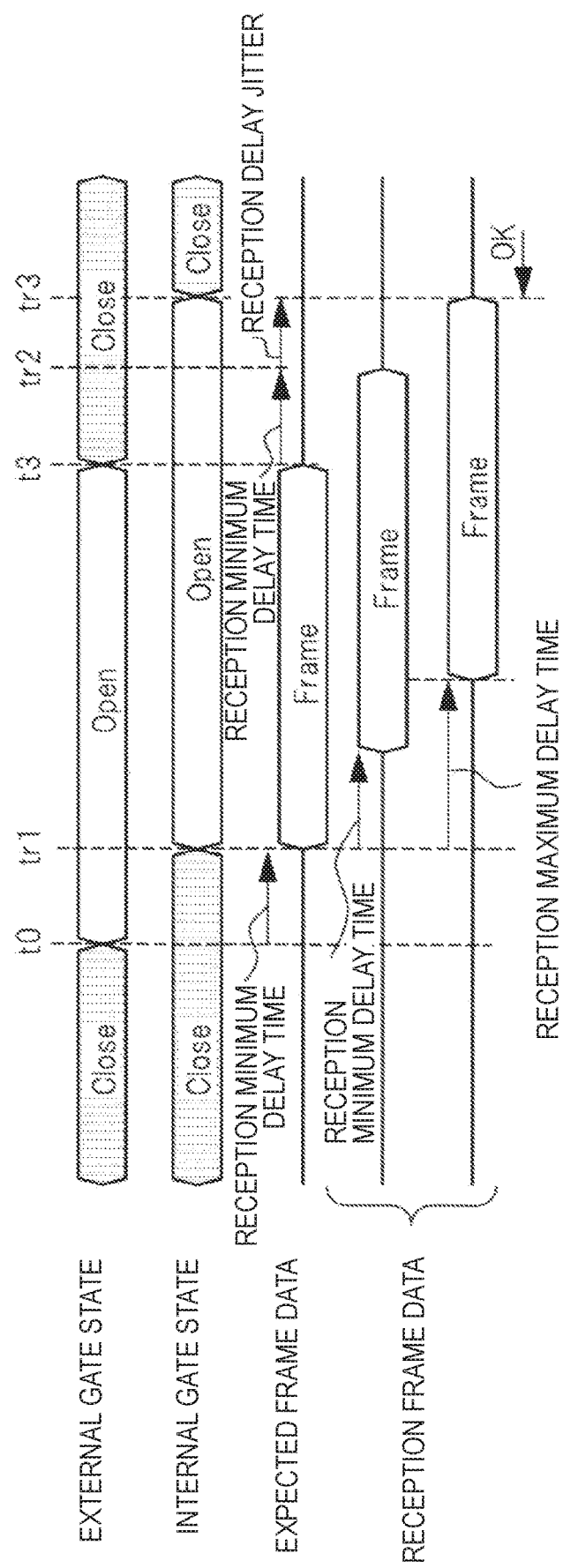
FIG. 14 is a timing chart for explaining the operation of the TSN controller related to second embodiment.

FIG. 11 is a diagram for explaining the operation of the TSN controller related to second embodiment. FIGS. 12 to 14 are timing diagrams for explaining the operation of the TSN controller 20 related to the second embodiment. The communication system 1 shown in FIG. 11 is similar to the communication system 100 shown in FIG. 23. Differences between FIG. 23 and FIG. 11 are the same as those described with reference to FIG. 5, and therefore, description thereof is omitted.

<Reception Frame Data>

FIG. 12 is a timing chart when the processor 102 receives the frame data from the sensor 108 in the communication system 100 shown in FIG. 23. When the sensor 108 starts transmitting the frame data as expected frame data to the TSN controller 105 (FIG. 23) at the time t0 at which the open period of the external gate state starts, the frame data is delayed because of the reception delay time as described in FIG. 23, and the frame data reaches the TSN controller 105 from the time t1 to the time t2. Since the reception delay time also fluctuates depending on environmental fluctuations like the transmission delay time, the time at which the frame data reaches the TSN controller 105 changes. Again, the smallest delay is reception minimum delay time, and the frame data reaches the TSN controller 105 at time t1. On the other hand, when the delay is the largest, it is reception maximum delay time, and the frame data reaches the TSN controller 105 at time t2. The reception delay time difference between reception maximum delay time and reception minimum delay time becomes the reception delay jitter, and the frame data reaches the TSN controller 105 in the range t1 to t2 of the reception delay jitter.

Since the time at which the head data of the frame data reaches the TSN controller 105 is delayed, the time at which the last data of the frame data reaches the TSN controller 105 is also delayed. When the arrival time of the last data of the frame data overlaps with the subsequent close period, the frame data transmitted from the sensor 108 at the time t0 is invalid and the frame data is discarded, for example.

In second embodiment, the processor 27 shown in FIG. 4 sets the external gate state open period, the external gate state close period, reception minimum delay time, reception maximum delay time, and the reception delay jitter in the setting register 21. The control unit 23 obtains the start time t0 of the open period of the external gate state based on the reception minimum delay time, reception maximum delay time and the reception delay jitter set in the setting register 21 and the time information from the clock generation circuit 25, and controls the buffer 22 by the control signal CNT so that the buffer 22 is opened later than the obtained start time t0 by a time corresponding to reception minimum delay time. As a result, the open period of the internal gate state starts at the time tr1 as shown in FIG. 13.

In addition, the control unit 23 obtains the end time t3 of the open period of the external gate state from the time information from the clock generation circuit 25, and controls the buffer 22 by the control signal CNT so that the buffer 22 is closed later than the obtained end time t3 by the time of the sum of the time corresponding to reception minimum delay time and the time corresponding to the reception delay jitter. As a result, the open period of the internal gate state ends at the time tr3 as shown in FIG. 13. Since the sum of the time corresponding to reception minimum delay time and the time corresponding to the reception delay jitter is the time corresponding to reception maximum delay time, the control unit 23 may control the buffer 22 so that the end time of the open period of the inner gate state is later than the end time t3 of the open period of the outer gate state by the time corresponding to reception maximum delay time.

As a result, as shown in FIG. 13, the TSN controller 20 starts the reception of the reception frame data so that the TSN controller 20 starts the writing of the frame data from the input/output unit 26 to the buffer 22 at the time tr1. If the reception delay time is reception minimum delay time, the head data of the frame data transmitted by the sensor 108 at time t0 reaches the TSN controller 20 at time tr1. Even if the reception delay time is reception maximum delay time, the head data of the frame data reaches the TSN controller 20 at the time tr4 obtained by adding the time corresponding to the reception delay jitter to the time tr1.

The open period of the inner gate state ends at time tr3, while the open period of the outer gate state ends at time t3. Therefore, as shown in FIG. 13, even if the reception delay time is reception maximum delay time, the last data of the frame data reaches the TSN controller 20 prior to the time tr3. As a result, it is possible to prevent the reception frame data from being processed as invalid.

FIG. 14 shows that the sensor 108 transmits the frame data as expected frame data at the same time as the starting time tr1 of the open period of the inner-gate state. In this case, when the last data of the expected frame data has arrived at the TSN controller 20 by the time tr3, the expected frame data can be received by the TSN controller 20 during the open period of the inner gate state, as shown in FIG. 14, and the reception frame data from the sensor 108 can be prevented from being processed as invalid.

In case of the data length of the frame data transmitted by the sensor 108 becomes longer, the time at which the last data of the frame data arrives at the TSN controller 20 exceeds the end time tr3 of the open period of the inner gate state. In this case, the TSN controller 20 processes the frame data from the sensor 108 as illegal frame data. That is, in this case, the TSN controller processes the data written to the buffer 22 to be discarded or isolated. The isolation of the data written in the buffer 22 will be described later with reference to FIG. 15.

Figure 15:
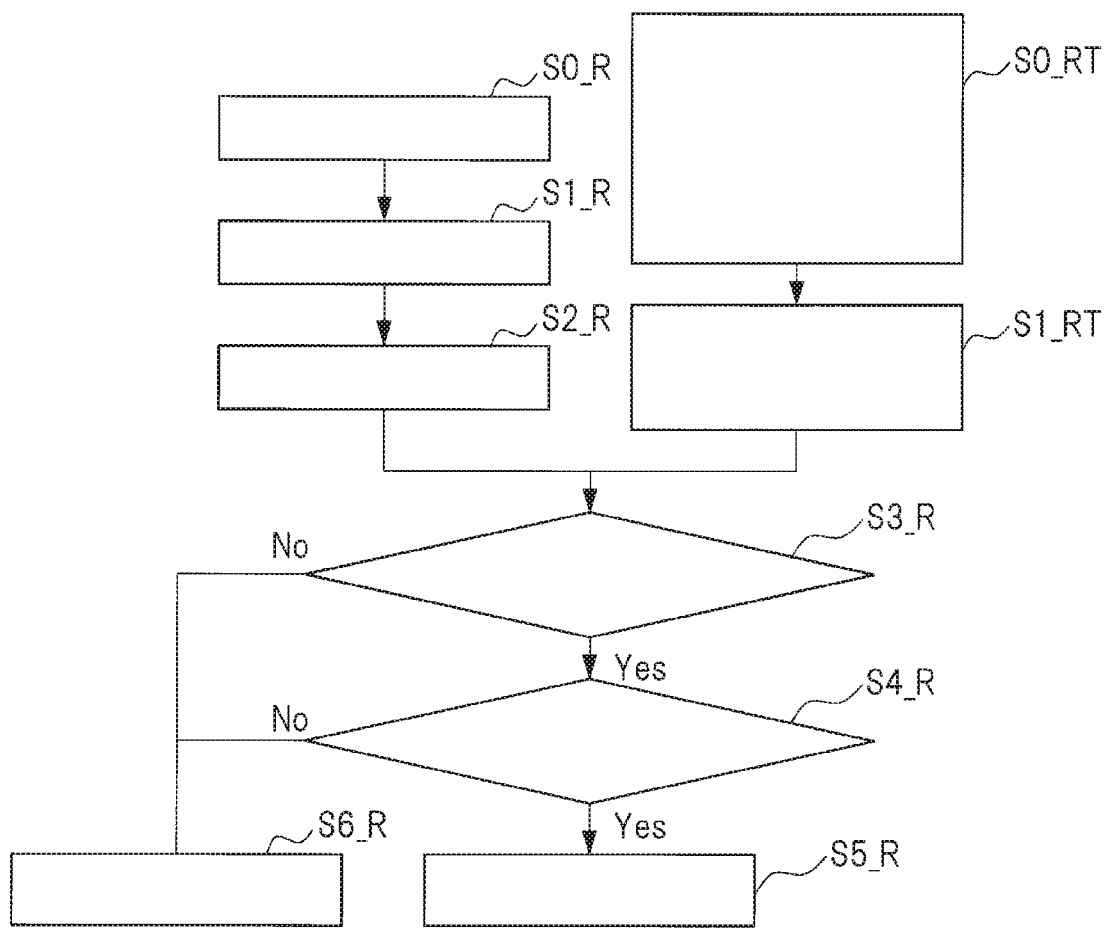
FIG. 15 is a flow chart showing the operation of TSN controllers related to second embodiment.

FIG. 15 is a flow chart showing the operation of the TSN controller related to second embodiment.

In step S0_RT, the processor 27 sets, as time information, the external gate states open period and close period, the external gate states reception maximum delay time, the reception minimum delay time, and the reception delay jitter in the setting register 21.

In step S1_RT, the control unit 23 generates an external gate state and an internal gate state for each of the queues based on the time information set in the setting register 21. That is, the control unit 23 obtains the times t0 and t3 shown in FIGS. 13 and 14 as the external gate state, and obtains the time tr1 to tr3 shown in FIGS. 13 and 14 as the internal gate state.

In step S0_R, the reception of frame data from the sensor 108 starts. That is, at the time tr1, the control unit 23 controls the buffer 22 by the control signal CNT so that the buffer 22 starts to fetch the frame data from the input/output unit 26. As a result, in step S1_R, the frame data is being received. In step S2_R, the TSN controller 20 calculates the data length of the frame data based on the frame data stored in the buffer 22. For example, the TSN controller 20 calculates the data length of the frame data being received based on the header HD existing in the head data portion of the frame data.

In step S3_R, the control unit 23 determines whether or not the inner gate state is open period, and determines whether or not the reception of frame data is started. If the control unit 23 determines that the internal gate state is open period and the internal gate state starts the reception of frame data, the control unit 23 next executes step S4_R, otherwise, the control unit 23 next executes step S6_R.

In operation S4_R, the control unit 23 determines whether the TSN controller 20 can complete the reception of frame data in the open period of the internal-gate state. That is, the control unit 23 obtains the remaining open time of the open period of the inner gate state when the step S4_R is executed, and obtains the remaining data length when the step S4_R is executed from the data length calculated in the step S2_R. The control unit 23 determines whether or not the remaining data length can be received within the obtained remaining open time. As a result, it is determined whether or not the reception of frame data is completed in the open period of the internal-gate state.

In step S4_R, when the control unit 23 determines that the reception of frame data is completed in open period, the control unit 23 next executes step S5_R, and in other cases, next executes step S6_R.

In step S5_R, the frame data from the sensor 108 is written into the buffer 22, and the control unit 23 controls the buffer 22 to close by the control signal CNT so that the buffer 22 does not take in the frame data from the input/output unit 26 at the end time tr3 at which the open period of the inner gate state ends. The frame data written to the buffer 22 is processed by the processor 27, for example, as data from the sensor 108.

In step S6_R, the control unit 23 discards or isolates the data stored in the buffer 22 as illegal data. Here, the isolation means that the TSN controller 20 transmits the data stored in the buffer 22 to, for example, the processor 27 and analyzes the data by the processor 27.

According to the second embodiment, when the frame data is received, margins are not set in the open period of the external gate state, thereby improving the efficiency of the communication systems. Further, according to the second embodiment, margins are not set in the open period of the external gate state even when the frame data is transmitted. Therefore, it is possible to further improve the efficiency of the communication system.

If the external gate states open period and close period related to the reception frame data and the external gate states open period and close period related to the transmission frame data described in first embodiment are the same, the processor 27 may not set open period and close period of the external gate states related to the reception frame data or the transmission frame data in the setting register 21 as time information. This makes it possible to suppress an increase in size of the setting register 21.

<Modification 1>

The transmission delay time and the reception delay time differ depending on the position of the sensor connected to the Ethernet bus 5. In the first modified example, a plurality of time information values, which differ depending on the position of the sensor, are set in the setting register 21. The TSN controller 20 selects the time information corresponding to the sensor to be communicated from the setting register 21 in accordance with the sensor to be communicated, and the TSN controller 20 generates the open period of the inner gate state. In this way, the open period of the inner gate state corresponding to each sensor can be generated.

<Modification 2>

In Modification 2, the smallest transmission minimum delay time out of the plurality of transmission minimum delay times corresponding to the position of the sensor is selected as the representative transmission minimum delay time, and the largest transmission maximum delay time out of the plurality of transmission maximum delay times is selected as the representative transmission maximum delay time. The time difference between the representative transmission minimum delay time and the representative transmission maximum delay time is defined as the representative transmission delay jitter. The processor sets the representative transmission maximum delay time, the representative transmission minimum delay time, and the representative transmit delay jitter as time information in the setting register 21.

Similarly, for the reception minimum delay time, reception maximum delay time and reception delay jitter, the representative reception maximum delay time, the representative reception minimum delay time and the representative reception delay jitter are set as time information in the setting register 21.

As a result, the open period of the internal gate state corresponding to the plurality of sensors can be generated while avoiding the increase in size of the setting register 21.

In first embodiment 2, the processor 27 sets time information in the setting register 21. For example, instead of the setting register 21, a fixed time information may be generated by logical circuits or the like.

If the values of transmission maximum delay time and reception maximum delay time are the same, the common maximum delay time may be set in the setting register 21. Similarly, when transmission minimum delay time and reception minimum delay time have the same values, they may be set in the setting register 21 as the shared smallest delay time. Similarly, when the transmission delay jitter and the reception delay jitter have the same value, the common delay jitter may be set in the setting register 21.

In FIG. 23, the time from the start of the transmission of the frame data by the TSN controller to the transmission of the frame data to the sensor 108 has been described as transmission delay time, and the time from the start of the transmission by the sensor 108 to the transmission of the frame data to the TSN controller has been described as reception delay time. In first embodiment 2, the TSN controller includes buffer 22. Therefore, the time until the frame data is transmitted from the buffer 22 and transmitted to the sensor 108 that is the device may be regarded as the transmission delay time, and the time until the frame data is transmitted from the sensor 108 that is the device and transmitted to the buffer 22 may be regarded as the reception delay time.

Third Embodiment

Figure 16:
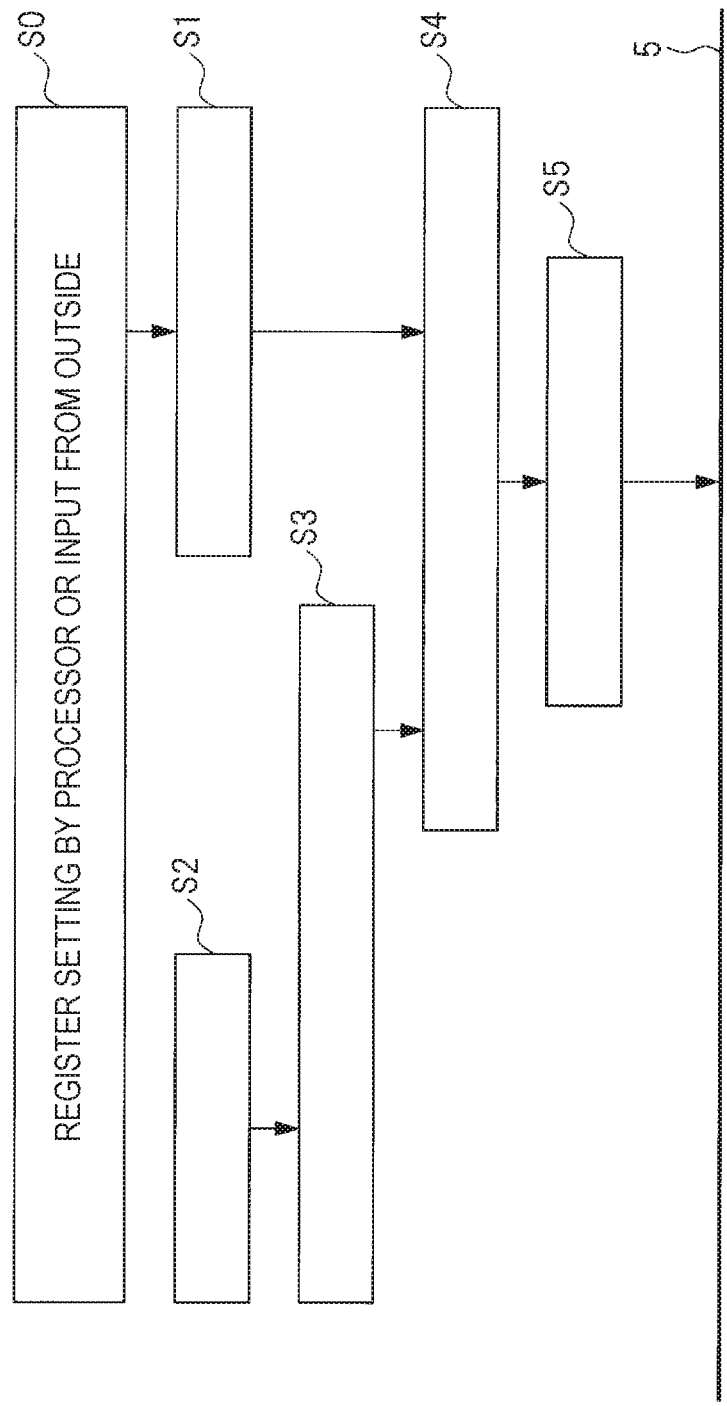
FIG. 16 is a diagram for explaining an operation of the communication systems related to third embodiment.

FIG. 16 is a diagram for explaining the operation of the communication systems related to third embodiment.

In third embodiment, in S0, the processor 27 sets, in the setting register 21, the time information relating to the transmission step to the sensor to be communicated. In step S1, the TSN controller 20 generates an internal gate state in accordance with the time information set in the setting register 21. Step S2 corresponds to step S0_T in FIG. 10, and is a step in which a frame transmission trigger is supplied.

Step S3 corresponds to steps S1_T and S2_T shown in FIG. 10, and is a step of obtaining information of frame data to be transmitted and calculating a data length of the frame data. Step S4 corresponds to steps S3_t and S4_T shown in FIG. 10, and is a step of determining whether or not to transmit the frame data stored in the buffer 22. Step S5 is a step corresponding to step S5_T in FIG. 10.

According to the third embodiment, the processor 27 sets the time information dynamically related to the transmission in the setting register 21 in accordance with the sensor to be communicated. This allows the open period of the inner gate state to be dynamically changed during communication, thereby improving the accuracy of the time division queuing algorithm.

Although the setting for the setting register 21 is dynamically changed here, the setting register 21 may not be provided in the TSN controller 20, and time information may be inputted from the outside of the switch controller 2.

Fourth Embodiment

Figure 17:
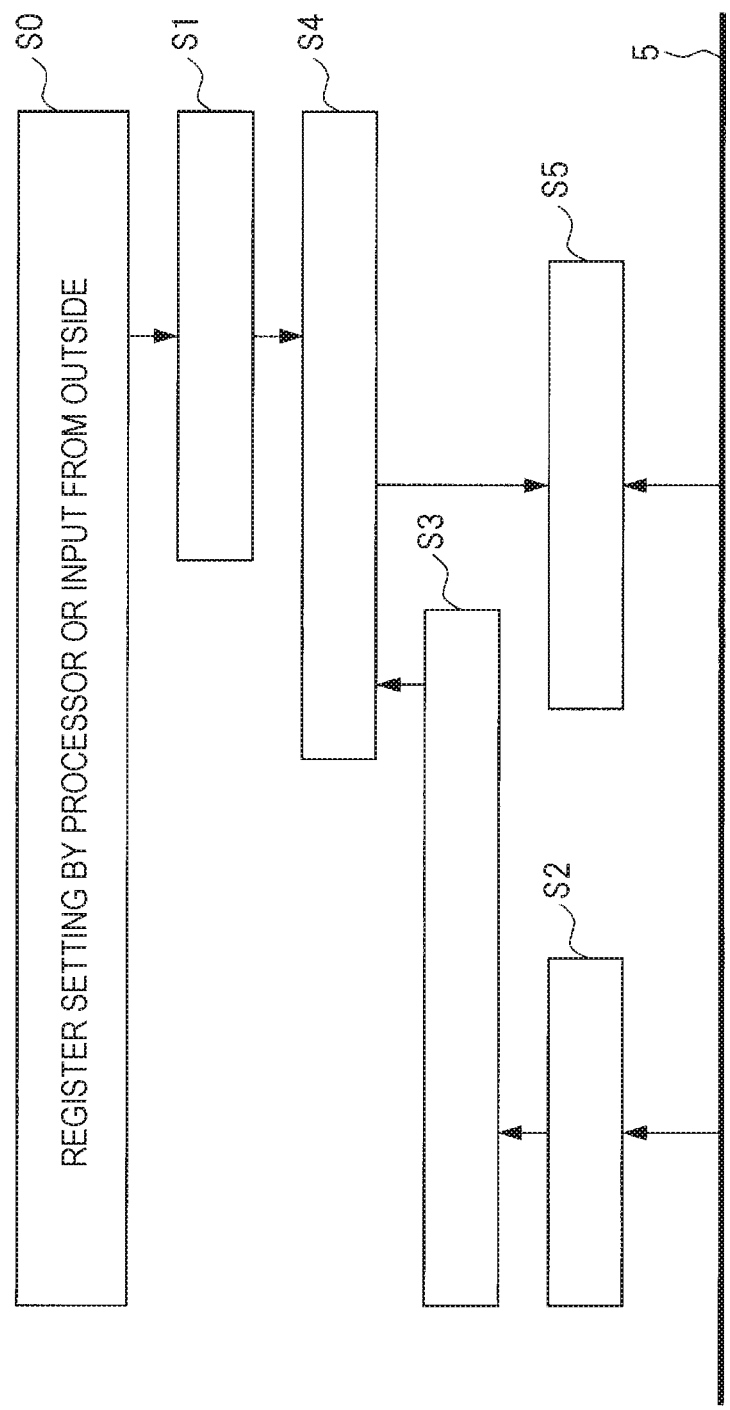
FIG. 17 is a diagram for explaining an operation of the communication systems related to fourth embodiment.

FIG. 17 is a diagram for explaining the operation of the communication systems related to fourth embodiment.

In fourth embodiment, in S0, the processor 27 sets time information relating to receive according to the sensor to be communicated in the setting register 21. In step S1, the TSN controller 20 generates an internal gate state in accordance with the time information set in the setting register 21. Steps S2 and S5 are steps in which a frame reception trigger is supplied via the Ethernet bus 5 and frame data is received. Step S3 corresponds to steps S0_R to S2_R shown in FIG. 15, and is a step of obtaining information of frame data and calculating a data length of the frame data. Step S4 corresponds to steps S3_R and S4_R shown in FIG. 15, and is a step of determining whether or not frame data can be received.

According to the fourth embodiment, the processor 27 dynamically sets the time information relating to receive in the setting register 21 in accordance with the sensor to be communicated. This allows the open period of the inner gate state to be dynamically changed during communication, thereby improving the accuracy of the time division queuing algorithm.

Although the setting for the setting register 21 is dynamically changed here, the setting register 21 may not be provided in the TSN controller 20, and time information may be inputted from the outside of the switch controller 2.

Fourth Embodiment

Figure 18:
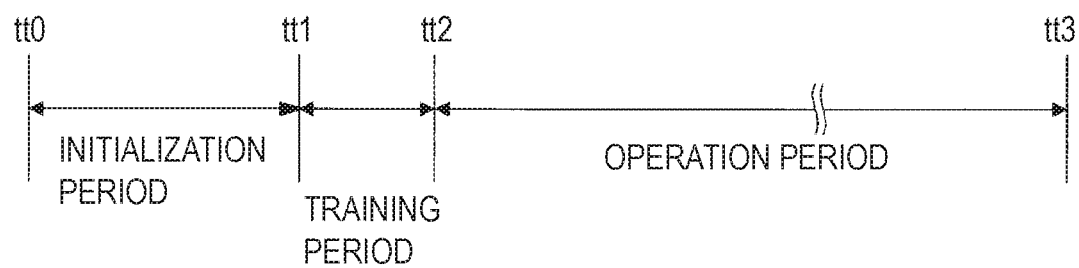
FIG. 18 is a timing diagram illustrating a control method of the communication systems related to fifth embodiment.

FIG. 18 is a timing diagram showing the control methods of the communication systems related to fifth embodiment. The control methods of the communication system related to fifth embodiment can be applied to any of the communication systems described in first embodiment to fourth embodiment. Here, the communication system 1 shown in FIGS. 5 and 11 will be described as an example. Methods of controlling communication systems related to fifth embodiment include an initialization step, a training step, and an operation step.

When the communication system 1 is powered on, for example, the initialization step is executed in an initialization period tt0 to tt1 shown in FIG. 18. When the initialization step is completed, the training step is executed in a training period tt1 to tt2. When the training step is completed, the training step for performing communication between the device connected to the Ethernet bus 5 is executed in an operation period tt2 to tt3. This operation period ends, for example, by shutting off the power to the communication system 1.

As described with reference to FIG. 5 and FIG. 11, the switch controller 2 and the sensors 106 and 108 included in the communication system 1 each include the clock generation circuits 25, 25_106, and 25_108.

In the initialization step, a time setting step for adjusting the time so that each of the clock generation circuits of the switch controller 2 and the sensors 106 and 108 measure the same time is included. Thus, in the training period and the operation period, each of the clock generation circuits measure the same time.

In the training step, a training operation is performed in order to obtain the time information to be set in the setting register 21. The training step related to fifth embodiment includes a training data transmission step for transmitting training data including time information, a delay time acquire step for obtaining delay time from time information included in the received training data, and a delay time setting step for setting delay time in the setting register 21. By executing these steps, a training operation is performed. Each step executed in the training step will be described with reference to FIGS. 5 and 11.

In the training data transmitting step, the TSN controller 20 transmits a transmission training data including time information indicating the current time measured by the clock generation circuit 25 to the sensor 108 via the Ethernet bus 5. On the other hand, the sensor 108 transmits a reception training data including time information indicating the current time measured by the clock generation circuit 25_108 included in the sensor 108 to the switch controller 2 via the Ethernet bus 5.

Next, in the delay time acquiring step, the switch controller 2 calculates the difference between the time represented by time information included in the reception training data transmitted from the sensor 108 and the time when the switch controller 2 acquires the reception training data represented by the clock generation circuit 25, and acquires this time difference as the reception delay time. By executing this operation a plurality of times, the switch controller 2 acquires a plurality of reception delay time. The switch controller 2 selects the longest reception delay time as the reception maximum delay time, the shortest reception delay time as the reception minimum delay time, and the differences between the two of the plurality of acquired reception delay time as the reception delay jitters.

In the delay time acquiring step, the sensor 108 calculates the difference between the time represented by the time information included in the transmission training data transmitted from the switch controller 2 and the time when the transmission training data represented by the clock generation circuit 25_108 is received, and acquires this time difference as the transmit delay time. By performing this operation, a plurality of times, the sensor 108 acquires a plurality of transmissions delay time. The sensor 108 selects the longest transmission delay time of the plurality of acquired transmission delay time as transmission maximum delay time, selects the shortest transmission delay time as transmission minimum delay time, and selects the differences between the two as transmission delay jitters. The sensor 108 transmits the selected transmission maximum delay time, transmission minimum delay time and transmit delay jitter to the switch controller 2 via the Ethernet bus 5.

Next, in the delay time setting step, the switch controller 2 sets the transmission maximum delay time, transmission minimum delay time and transmit delay jitter received from the sensor 108 and the reception maximum delay time, reception minimum delay time and receive delay jitter selected by the switch controller 2 in the setting register 21. Although not particularly limited, in the delay time setting step, the processor 27 also sets time information relating to the external gate states open period and close period from the clock generation circuit 25 in the setting register 21.

The switch controller 2 also performs the training operation with other device such as the sensor 106 connected to the Ethernet bus 5. As a result, the transmission maximum delay time, transmission minimum delay time and transmit delay jitter and the reception maximum delay time, reception minimum delay time and receive delay jitter of each device connected to the Ethernet bus 5 are set in the setting register 21 of the switch controller 2 during the training period.

In the following operation periods, as described in first embodiment to fourth embodiment, the internal gate state is generated, and the communication between the device is performed in the open period of the internal gate state.

According to the fifth embodiment, since the transmission maximum delay time, transmission minimum delay time and transmit delay jitter and the reception maximum delay time, reception minimum delay time and receive delay jitter are obtained by actually performing communication, an inner gate state corresponding to the surrounding environments when training is performed can be generated.

In the operation period, the initialization operation and the training operation may be executed in a timely manner. By doing so, it is possible to reduce the influence of environmental fluctuation.

Figure 19:
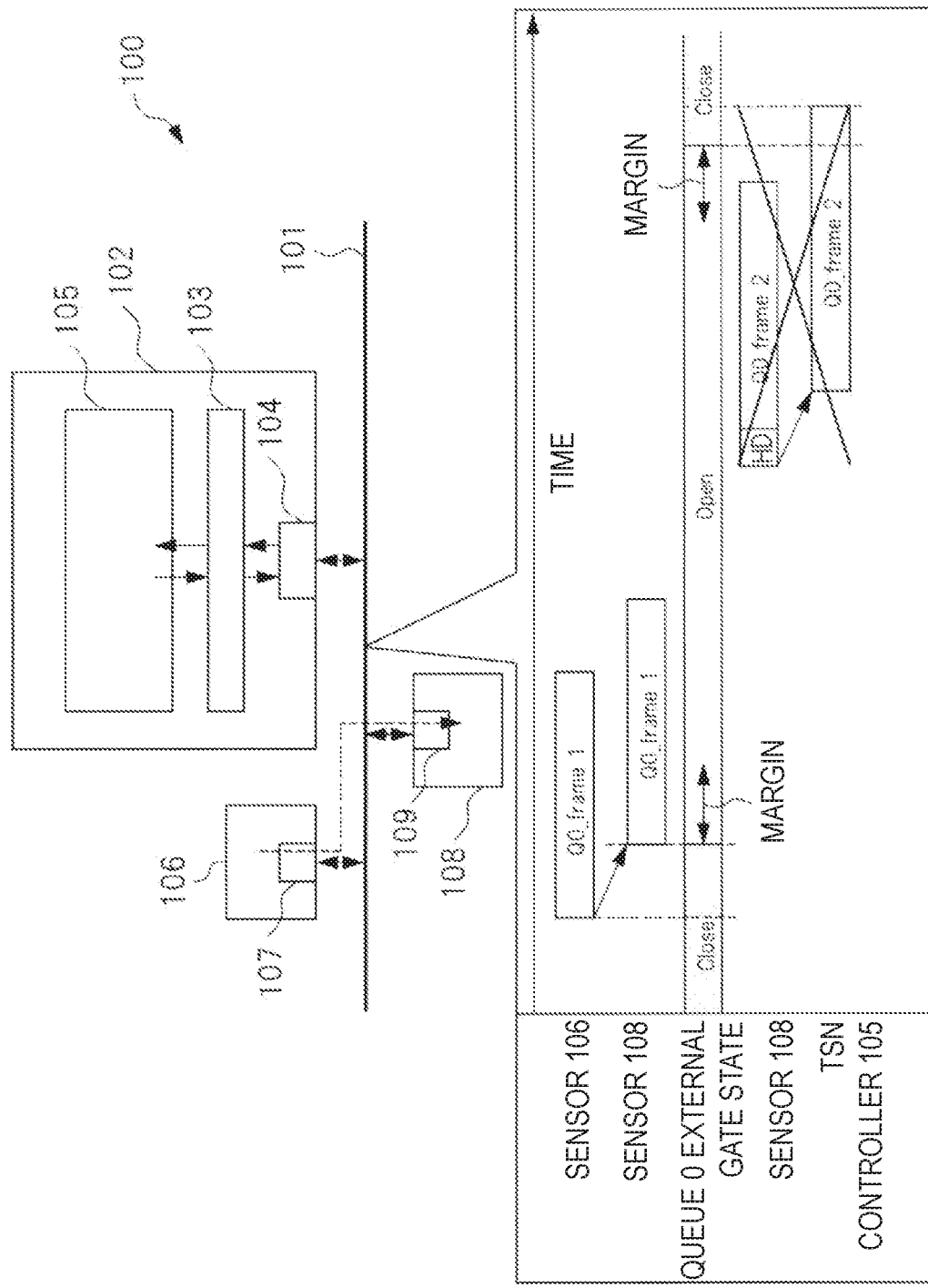
FIG. 19 is a diagram for explaining a problem.

FIG. 19 is a diagram for explaining a further problem. FIG. 19 is similar to FIG. 23. In FIG. 19, as in FIG. 23, communication is performed between the processor 102 and the sensor 108 while the external gate state of the queue 0 is open. As described in FIG. 23, margins are set in the open period of the external gate state of the queue 0. FIG. 19 shows a case where the sensor 106 transmits abnormal frame data Q0_frame1 ignoring open period and close period in the queue 0 external gate state to the Ethernet bus 5.

Since the open period of the Queue 0 external gate state has a margin set, there is a risk that the sensor 108 receives abnormal frame data from the sensor 106, not the frame data Q0_frame1 transmitted from the processor 102, during the margin. That is, by transmitting the abnormal frame data ignoring the external gate states open period and close period to the Ethernet bus 5, for example, the sensor 108 can be operated arbitrarily, thereby decreasing the security.

Further, when frame data is transmitted from the sensor 108 to the processor 102, when frame data Q0_frame2 that is margined is transmitted, a part of the frame data Q0_frame2 may be transmitted due to close period as shown in FIG. 19, so that the frame data Q0_frame2 cannot be transmitted. For this reason, frame data having a long data length cannot be transmitted, which lowers latency and lowers efficiency.

Figure 20:
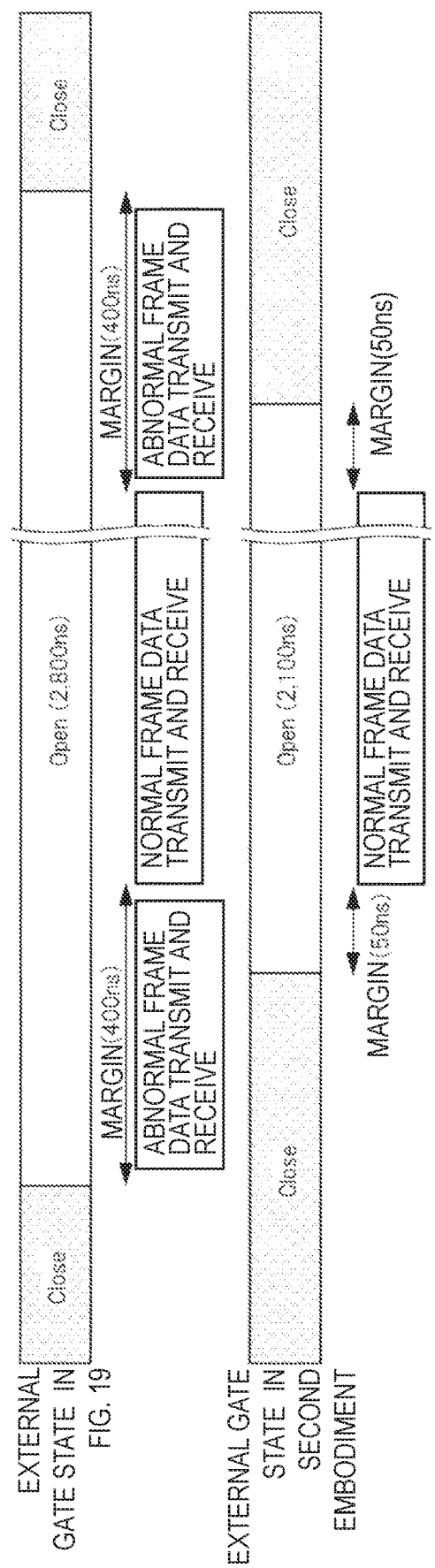
FIG. 20 is a diagram for explaining an effect of the communication system according to the embodiment.

FIG. 20 is a diagram for explaining an effect of the communication system according to the embodiment. In the drawing, the upper side of the drawing shows the external gate state in the communication system shown in FIG. 19. The lower part of FIG. 20 shows gate states in the communication systems related to second embodiment.

Assuming that the time of traffic required to communicate the frame data is 2,000 ns, a margin of, for example, about 20% of the frame data is set before and after the frame data. That is, when the external gate state is switched from close period to open period, and when the external gate state is switched from open period to close period, a margin of 400 ns is set. As a result, the open period of the external gate state is set to 2,000 ns+800 ns=2,800 ns.

On the other hand, the margins of the inner gate states in second embodiment need only be transmission minimum delay time or reception minimum delay time when switching from close period to open period. The margin when the internal gate state is switched from open period to close period is transmission maximum delay time or reception maximum delay time. Transmission maximum delay time and reception maximum delay time are, for example, less than 50 ns. Therefore, in the second embodiment, as shown in FIG. 20, it is only necessary to set a margin of 50 ns, for example, before and after 2,000 ns of traffic required to communicate frame data. That is, the margin can be suppressed from 400 ns to less than 50 ns.

Assuming that the communication rate in the communication systems, i.e., the Ethernet communication rate, is 1 Gbps, 1-bit communication can be performed in 1 ns. If the continuous 400 ns is set as the margin, communication of 400 bits becomes possible in the period of the margin. On the other hand, the header HD of the Ethernet is 176 bits. Therefore, it is possible to insert the header of the abnormal frame data during the margin period, which is not be desirable for ensuring sufficient security. In contrast, in the communication systems related to second embodiment, the margins in the inner-gate state are 50 ns, which is shorter than the 176 ns necessary to communicate the headers HD, so that abnormal frame data can be prevented from being inserted by transmission and reception. As a result, in the embodiment, sufficient security can be ensured.

Figure 21:
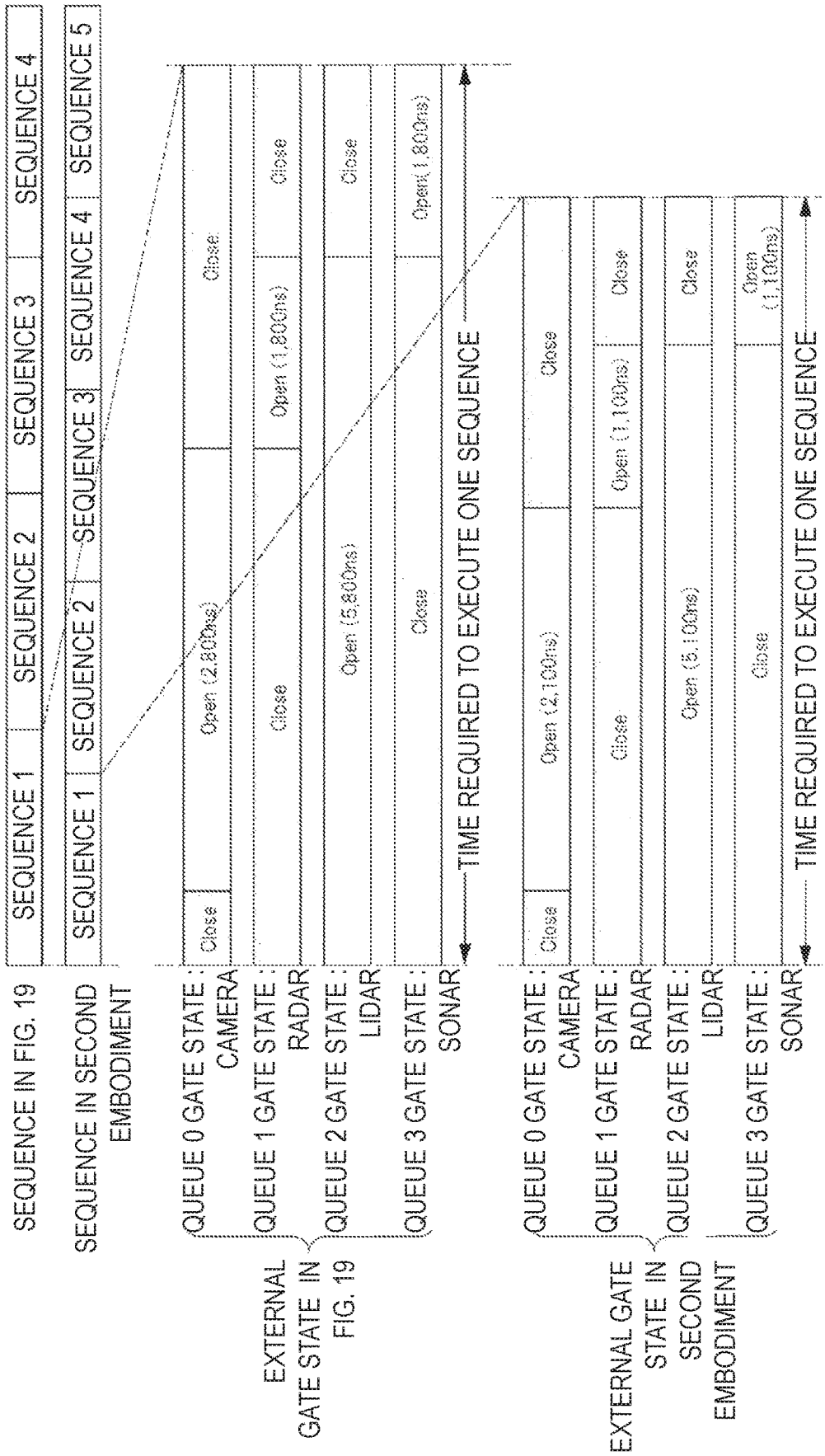
FIG. 21 is a diagram for explaining an effect of the communication system according to the embodiment.

FIG. 21 is a diagram for explaining an effect of the communication system according to the embodiment. FIG. 21 shows a sequence in the communication system of FIG. 19 and a sequence in accordance with second embodiment in the communication system of FIG. 19. In each of the sequences, the queued external gate state comprises open period and close period, and data communication is allowed in open period. FIG. 21 shows queue 0 external gate state: camera to queue 3 external gate state: sonar as the queue external gate state in each sequence. Queue 0 External Gate State: Camera to Queue 3 External Gate State: sonar is the same as in FIG. 2.

In the communication system of FIG. 19, a margin of 400 ns is set before and after the open period of the external gate state open period shown in FIG. 2, and a margin of 800 ns is added to the external gate state open period. Therefore, for example, in the case of the queue 0 external gate state: camera, open period is 2,800 ns, and in the case of the queue 3 external gate state: sonar, open period is 1,800 ns. The sum of open period and close period, with an added 800 ns margin, is the amount of time it takes to execute a sequence.

As described above, in the second embodiment, since the margin period added to the open period of the internal gate state is as short as 100 ns, the open period of the internal gate state can be shortened. FIG. 21 shows that open period of the inner gate state is set as open period of the outer gate state by second embodiment. Therefore, for example, in the case of the queue 0 external gate state: camera, open period is 2,100 ns, and in the case of the queue 3 external gate state: sonar, open period is 1,100 ns. That is, it is possible to shorten the time required to execute one sequence. Thereby, as shown in FIG. 21, in the communication system of FIG. 19, five sequences of sequence 1 to sequence 5 can be executed in the sequence according to second embodiment while only four sequences of sequence 1 to sequence 4 can be executed in the communication system of FIG. 19. That is, according to the embodiment, it is possible to improve the latency and improve the efficiency of the communication system.

Although the invention made by the present inventor has been specifically described based on the embodiment, the present invention is not limited to the embodiment described above, and it is needless to say that various modifications can be made without departing from the gist thereof.

What is claimed is:

1. A semiconductor device, comprising:
a clock generation circuit supplying time information; and
a controller inputting the time information, and transmitting or receiving data,
wherein the semiconductor device is permitted reception or transmission of the data during an open period, and is not permitted transmission or reception of the data during a close period,
wherein the open period and the close period are determined by the time information,
wherein the controller starts the transmission of the data earlier than a start of the open period, and
wherein the controller starts the reception of the data later than the start of the open period.

2. The semiconductor device according to claim 1,
wherein the controller comprises a delay time setting unit,
wherein the delay time setting unit is set with a transmission maximum delay time, a transmission minimum delay time, and a transmission delay time difference between the transmission maximum delay time and the transmission minimum delay time, in case of the data is transmitted to a first device connected to the controller via a bus, and
wherein the controller starts transmission of the data earlier than the start of the open period by a time corresponding to the transmission minimum delay time, and the controller ends the transmission of the data earlier than the end of the open period by a time corresponding to the transmission maximum delay time.

3. The semiconductor device according to claim 2,
wherein the delay time setting unit is set with a reception maximum delay time, a reception minimum delay time, and a reception delay time difference between the reception maximum delay time and the reception minimum delay time, in case of data is received from a second device connected to the bus, and
wherein the controller starts reception of data later than the start of the open period by a time corresponding to the reception minimum delay time, and the controller ends the reception of data later than the end of the open period by a time corresponding to the reception maximum delay time.

4. The semiconductor device according to claim 3,
wherein the controller comprises a first buffer in which data to be transmitted is stored, and a second buffer in which received data is stored,
wherein the transmission minimum delay time is a minimum delay time in case of data is transmitted from the first buffer to the first device,
wherein the transmission maximum delay time is a maximum delay time in case of data is transmitted from the first buffer to the first device
wherein the reception minimum delay time is a minimum delay time in case of data is transmitted from the second device to the second buffer, and wherein the reception maximum delay time is a maximum delay time in case of data is transmitted from the second device to the second buffer.

5. The semiconductor device according to claim 4,
wherein the first buffer and the second buffer are the same buffer, and
wherein the first device and the second device are the same device.

6. The semiconductor device according to claim 1,
wherein the controller comprises a delay time setting unit,
wherein the delay time setting unit is set with a reception maximum delay time, a reception minimum delay time, and a reception delay time difference between the transmission maximum delay time and the transmission minimum delay time, in case of data is received from a device connected to the controller via a bus, and
wherein the controller starts reception of the data later than the start of the open period by a time corresponding to the reception minimum delay time, and the controller ends reception of the data later than the end of the open period by a time corresponding to the reception maximum delay time.

7. The semiconductor device according to claim 1, further comprising;
an input/output circuit transmitting the data to outside of the semiconductor device, and receiving the data from the semiconductor device,
wherein the controller starts the transmission of the data to the input/output circuit earlier than a start of the open period.

8. A communication system comprising:
a first device connected to a first bus; and
a second device connected to the first device via the first bus,
wherein the first device comprises;
a first clock generation circuit supplying time information; and
a controller inputting the time information, and transmitting or receiving data,
wherein based on the time information, an open period and a close period and are determined,
wherein first device is permitted reception or transmission of data during the open period, and is not permitted transmission or reception of the data during the close period,
wherein the controller starts the transmission of the data earlier than a start of the open period, and
wherein the controller starts the reception of the data later than the start of the open period.

9. The communication system according to claim 8,
wherein the controller comprises a delay time setting unit,
wherein the delay time setting unit is set with a transmission maximum delay time, a transmission minimum delay time, and a transmission delay time difference between the transmission maximum delay time and the transmission minimum delay time, in case of data is transmitted to a first device connected to the controller via a bus, and
wherein the controller starts transmission of the data earlier than the start of the open period by a time corresponding to the transmission minimum delay time, and the controller ends transmission of the data earlier than the end of the open period by a time corresponding to the transmission maximum delay time.

10. The communication system according to claim 9,
wherein the delay time setting unit is set with a reception maximum delay time, a reception minimum delay time, and a reception delay time difference between the reception maximum delay time and the reception minimum delay time, in case of data is received from a second device, and
wherein the controller starts reception of data later than the start of the open period by a time corresponding to the reception minimum delay time, and the controller ends reception of data later than the end of the open period by a time corresponding to the reception maximum delay time.

11. The communication system according to claim 10,
wherein the second device comprises a second clock generation circuit for measuring time in synchronization with the first clock generation circuit, and
wherein the second device is permitted to receive or transmit data during the open period defined by the second clock generation circuit.

12. The communication system according to claim 11,
wherein the open period defined by the first clock generation circuit and the open period defined by the second clock generation circuit are overlapped.

13. The communication system according to claim 8,
wherein the controller comprises a delay time setting unit,
wherein the delay time setting unit is set with a reception maximum delay time, a reception minimum delay time, and a reception delay time difference between the reception maximum delay time and the reception minimum delay time, in case of data is received from the second device, and
wherein the controller starts reception of data later than the start of the open period by a time corresponding to the reception minimum delay time, and the controller ends the reception of data later than the end of the open period by a time corresponding to the reception maximum delay time.

14. A method for controlling a communication system:
a first device; and
a second device coupled to the first device via a bus,
wherein the first device comprises:
a first clock generation circuit defining an open period in which data reception or transmission is permitted and a close period in which data transmission or reception is not permitted;
a delay time setting unit; and
a controller performing transmission or reception of data in a period other than the open period based on time information set in the delay time setting unit,
wherein the second device comprises:
a second clock generation circuit defining an open period in which data reception or transmission is permitted and a close period in which data transmission or reception is not permitted,
a training step for determining the time information set in the delay time setting unit; and
an operating step in which transmission of data or reception of data is performed between the first device and the second device after the training step.

15. The method for controlling a communication system according to claim 14,
wherein the training step includes:
a reception delay time obtaining step for obtaining a delay time in case of receiving the data by the first device; and a setting step for setting time information related to the delay time obtained by the reception delay time obtaining step in the delay time setting unit, wherein the reception delay time obtaining step includes;

receiving a reception training data including time information from the second device by the first device, and obtaining the delay time by the first device based on the time information included in the reception training data and based on a time measured by the first clock generation circuit in case of receiving the reception training data.

16. The method for controlling a communication system according to claim 15, wherein the training step includes:

a transmission delay time obtaining step for obtaining a delay time in case of transmitting the data by the first device; and a setting step for setting time information related to the delay time obtained by the transmission delay time obtaining step in the delay time setting unit, wherein the transmission delay time obtaining step includes;

transmitting a transmission training data including time information from the first device to the second device; and obtaining the delay time by the second device based on the time information included in the transmission training data and based on a time measured by the second clock generation circuit in case of receiving the transmission training data.

17. The method for controlling a communication system according to claim 16, further comprising the step of:

before the step of the training step, a time setting step for synchronizing the first clock generation circuit and the second clock generation circuit.

18. The method for controlling a communication system according to claim 14, wherein the training step includes:

a transmission delay time obtaining step for obtaining a delay time in case of transmitting the data by the first device; and a setting step for setting the delay time obtained by the transmission delay time obtaining step in the delay time setting unit, wherein the transmission delay time obtaining step includes;

transmitting a transmission training data including time information from the first device to the second device; and obtaining the delay time by the second device based on the time information included in the transmission training data and based on a time measured by the second clock generation circuit in case of receiving the transmission training data.

* * * * *